US011772404B2

(12) United States Patent
Schmid et al.

(10) Patent No.: US 11,772,404 B2
(45) Date of Patent: Oct. 3, 2023

(54) PROCESSES FOR PRODUCING OPTICAL EFFECTS LAYERS

(71) Applicant: SICPA HOLDING SA, Prilly (CH)

(72) Inventors: Mathieu Schmid, Lausanne (CH); Evgeny Loginov, Renens (CH); Claude-Alain Despland, Prilly (CH)

(73) Assignee: SICPA HOLDING SA, Prilly (CH)

(*) Notice: Subject to any disclaimer, the term of this patent is extended or adjusted under 35 U.S.C. 154(b) by 97 days.

(21) Appl. No.: 16/962,803

(22) PCT Filed: Dec. 14, 2018

(86) PCT No.: PCT/EP2018/085030
§ 371 (c)(1),
(2) Date: Jul. 16, 2020

(87) PCT Pub. No.: WO2019/141452
PCT Pub. Date: Jul. 25, 2019

(65) Prior Publication Data
US 2021/0088959 A1 Mar. 25, 2021

(30) Foreign Application Priority Data

Jan. 17, 2018 (EP) .................................... 18152081
Jan. 17, 2018 (EP) .................................... 18152082

(51) Int. Cl.
*B41M 7/00* (2006.01)
*B42D 25/364* (2014.01)
(Continued)

(52) U.S. Cl.
CPC ........... *B41M 7/0045* (2013.01); *B05D 3/067* (2013.01); *B05D 3/207* (2013.01); *B41F 19/005* (2013.01);
(Continued)

(58) Field of Classification Search
CPC .. B42D 2035/20; B42D 25/369; B42D 25/29; G02F 1/1333; B44F 1/08; B05D 3/207; B05D 5/06; B41M 3/14; B41M 7/0045
See application file for complete search history.

(56) References Cited

U.S. PATENT DOCUMENTS 2,418,479 A 4/1947 Pratt et al.
2,570,856 A 10/1951 Pratt et al.
(Continued)

FOREIGN PATENT DOCUMENTS

CN 109311051 2/2019
CN 109414722 3/2019
(Continued)

OTHER PUBLICATIONS

International Search Report along with the Written Opinion issued with respect to application No. PCT/EP2018/085030.
(Continued)

*Primary Examiner* — Tabassom Tadayyon Eslami
(74) *Attorney, Agent, or Firm* — Muncy, Geissler, Olds & Lowe, P.C.

(57) ABSTRACT

The present invention relates to the field of and processes and printing apparatuses for producing optical effect layers (OEL) comprising magnetically oriented platelet-shaped magnetic or magnetizable pigment particles on a substrate. In particular, the present invention relates to processes using printing apparatuses comprising a first magnetic-field-generating device mounted on a transferring device (TD) and a static second magnetic-field-generating device for producing said OELs as anti-counterfeit means on security documents or security articles or for decorative purposes.

13 Claims, 5 Drawing Sheets

(51) Int. Cl.

| | |
|---|---|
| *B42D 25/369* | (2014.01) |
| *B42D 25/41* | (2014.01) |
| *B05D 3/06* | (2006.01) |
| *B05D 3/00* | (2006.01) |
| *B41F 19/00* | (2006.01) |
| *B44F 1/08* | (2006.01) |
| *C09D 11/037* | (2014.01) |
| *C09D 11/101* | (2014.01) |
| *G03G 19/00* | (2006.01) |

(52) U.S. Cl.
CPC ......... *B42D 25/364* (2014.10); *B42D 25/369* (2014.10); *B42D 25/41* (2014.10); *B44F 1/08* (2013.01); *C09D 11/037* (2013.01); *C09D 11/101* (2013.01); *G03G 19/00* (2013.01)

(56) References Cited

U.S. PATENT DOCUMENTS

| | | |
|---|---|---|
| 3,676,273 A | 7/1972 | Stuart |
| 3,791,864 A | 2/1974 | Steingroever |
| 4,838,648 A | 6/1989 | Phillips et al. |
| 5,364,689 A | 11/1994 | Kashiwagi et al. |
| 5,630,877 A | 5/1997 | Kashiwagi et al. |
| 6,103,361 A | 8/2000 | Batzar et al. |
| 6,410,130 B1 | 6/2002 | Schuhmacher et al. |
| 6,531,221 B1 | 3/2003 | Schuhmacher et al. |
| 6,582,781 B1 | 6/2003 | Schuhmacher et al. |
| 6,838,166 B2 | 1/2005 | Phillips et al. |
| 8,025,952 B2 | 9/2011 | Raksha et al. |
| 8,343,615 B2 | 1/2013 | Raksha et al. |
| 2002/0160194 A1 | 10/2002 | Phillips et al. |
| 2004/0009308 A1 | 1/2004 | Schlaf et al. |
| 2004/0009309 A1 | 1/2004 | Raksha et al. |
| 2005/0106367 A1 | 5/2005 | Raksha et al. |
| 2006/0081151 A1* | 4/2006 | Raksha .................. B41M 3/144 427/457 |
| 2006/0097515 A1 | 5/2006 | Raksha et al. |
| 2010/0040799 A1 | 2/2010 | Raksha et al. |
| 2013/0084411 A1 | 4/2013 | Raksha et al. |
| 2016/0325310 A1 | 11/2016 | Schmid et al. |
| 2017/0001216 A1 | 1/2017 | Raksha et al. |
| 2017/0253070 A1 | 9/2017 | Loginov et al. |
| 2017/0305184 A1 | 10/2017 | Muller |
| 2018/0311701 A1 | 11/2018 | Loginov et al. |
| 2018/0326453 A1 | 11/2018 | Loginov et al. |
| 2019/0030939 A1 | 1/2019 | Loginov et al. |
| 2019/0160850 A1 | 5/2019 | Loginov et al. |
| 2019/0217335 A1 | 7/2019 | Nikseresht Ghanepour et al. |
| 2019/0314857 A1* | 10/2019 | Nikseresht Ghanepour ................ B42D 25/29 |
| 2020/0346479 A1* | 11/2020 | Schmid ................ B41F 19/005 |

FOREIGN PATENT DOCUMENTS

| | | |
|---|---|---|
| DE | 2006848 | 9/1971 |
| EP | 0406667 | 1/1995 |
| EP | 0710508 | 5/1996 |
| EP | 0686675 | 2/1998 |
| EP | 1666546 | 6/2006 |
| EP | 1710756 | 10/2006 |
| EP | 2157141 | 2/2010 |
| EP | 1819525 | 3/2010 |
| EP | 1519794 | 12/2010 |
| EP | 2263806 | 12/2010 |
| EP | 2263807 | 12/2010 |
| EP | 2306222 | 4/2011 |
| EP | 2325677 | 5/2011 |
| EP | 2402401 | 1/2012 |
| EP | 1674282 | 6/2013 |
| EP | 15189955 | 10/2015 |
| EP | 15193837 | 10/2015 |
| EP | 16157815 | 2/2016 |
| EP | 16190044 | 9/2016 |
| EP | 3374093 | 10/2019 |
| EP | 3362190 | 11/2019 |
| EP | 3423197 | 11/2019 |
| WO | 2002009002 | 1/2002 |
| WO | 2002073250 | 9/2002 |
| WO | 2003000801 | 1/2003 |
| WO | 2004007095 | 1/2004 |
| WO | 2005002866 | 1/2005 |
| WO | 2006061301 | 6/2006 |
| WO | 2006063926 | 6/2006 |
| WO | 2007131833 | 11/2007 |
| WO | 2008046702 | 4/2008 |
| WO | 2010058026 | 5/2010 |
| WO | 2011092502 | 8/2011 |
| WO | 2012104098 | 8/2012 |
| WO | 2012165037 | 12/2012 |
| WO | 2013167425 | 11/2013 |
| WO | 2014198905 | 12/2014 |
| WO | 2015086257 | 6/2015 |
| WO | 2018054819 | 3/2018 |

OTHER PUBLICATIONS

"Handbook of print media", Helmut Kipphan, Springer Edition, 2001, p. 48.

Halbach permanent magnet machines and applications: a review, Z.Q. Zhu et D. Howe, IEE. Proc. Electric Power Appl., 2001, 148, p. 299-308.

Printing Technology, J.M. Adams and p. A. Dolin, Delmar Thomson Learning, 5th Edition, 2002, pp. 293-328.

Printing Technology, J. M. Adams and P.A. Dolin, Delmar Thomson Learning, 5th Edition, 2002, pp. 359-360.

The Printing ink manual, R.H. Leach and R.J. Pierce, Springer Edition, 5th Edition, 2008, pp. 33-42.

The Printing ink manual, R.H. Leach and R.J. Pierce, Springer Edition, 5th Edition, 2008, pp. 42-51.

The Printing ink manual, R.H. Leach and R.J. Pierce, Springer Edition, 5th Edition, 2008, pp. 58-62.

Extended European Search Report in counterpart European Application No. 18152082.6 dated Jul. 24, 2018.

Notification of First Office Action and Search Report issued in corresponding Chinese Application No. 201880086880.5 dated Feb. 17, 2022 (and English language translation of the Office Action).

Japan Patent Office Action in counterpart Japan Application No. JP2020-538918 dated Dec. 6, 2022 (and English language translation of Office Action), 5 pages.

Extended European Search Report dated Jul. 24, 2018 issued in corresponding European Application No. 18152082.6.

International Search Report (with English translation) and Written Opinion dated Mar. 14, 2019 issued in corresponding Application No. PCT/EP2018/085030.

* cited by examiner

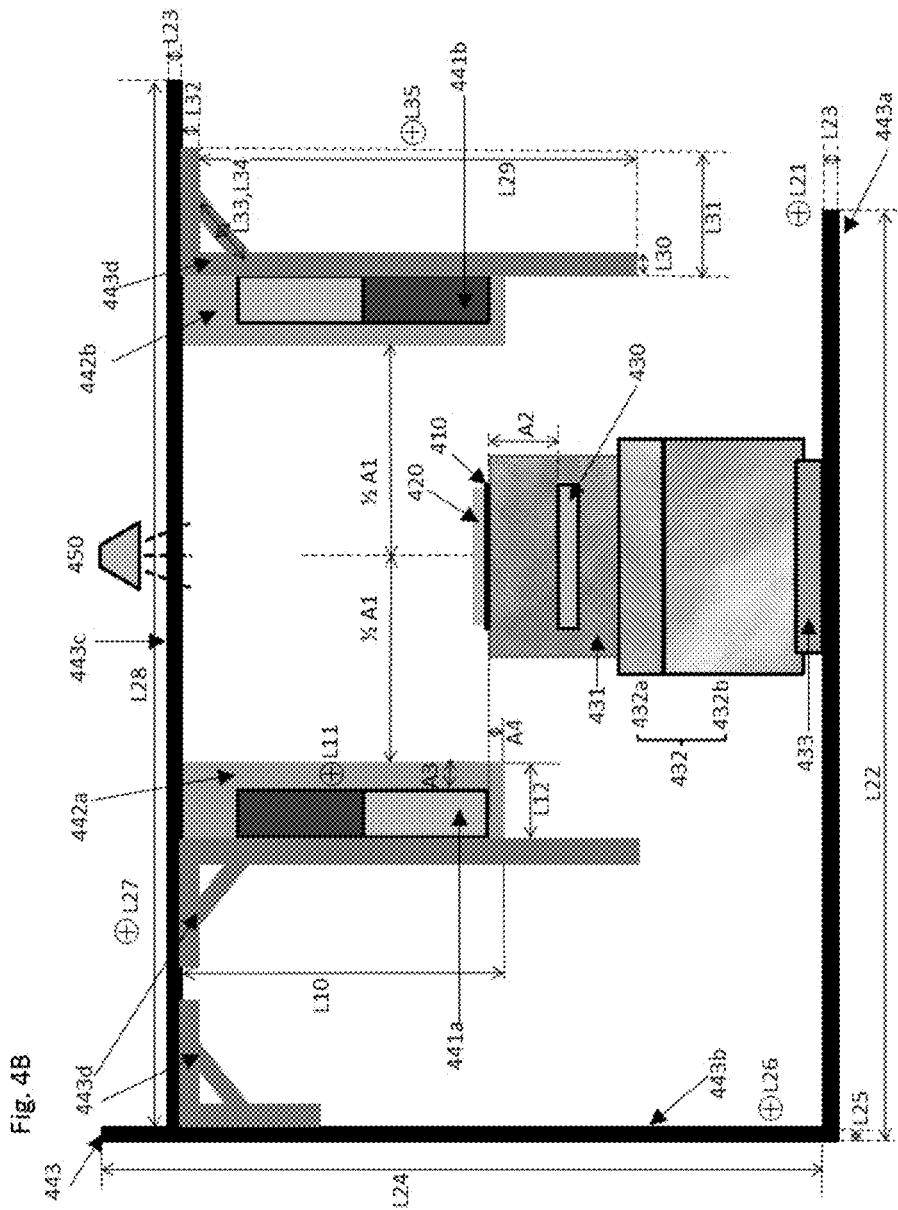

PROCESSES FOR PRODUCING OPTICAL EFFECTS LAYERS

FIELD OF THE INVENTION

The present invention relates to the field of processes and printing apparatuses for producing optical effect layers (OELs) comprising magnetically oriented platelet-shaped magnetic or magnetizable pigment particles. In particular, the present invention provides processes and printing apparatuses for magnetically orienting platelet-shaped magnetic or magnetizable pigment particles in coating layer so as to produce OELs and the use of said OELs as anti-counterfeit means on security documents or security articles as well as decorative purposes.

BACKGROUND OF THE INVENTION

It is known in the art to use inks, compositions, coatings or layers containing oriented magnetic or magnetizable pigment particles, particularly also optically variable magnetic or magnetizable pigment particles, for the production of security elements, e.g. in the field of security documents. Coatings or layers comprising oriented magnetic or magnetizable pigment particles are disclosed for example in U.S. Pat. Nos. 2,570,856; 3,676,273; 3,791,864; 5,630,877 and 5,364,689. Coatings or layers comprising oriented magnetic color-shifting pigment particles, resulting in particularly appealing optical effects, useful for the protection of security documents, have been disclosed in WO 2002/090002 A2 and WO 2005/002866 A1.

Security features, e.g. for security documents, can generally be classified into "covert" security features on the one hand, and "overt" security features on the other hand. The protection provided by covert security features relies on the principle that such features are difficult to detect, typically requiring specialized equipment and knowledge for detection, whereas "overt" security features rely on the concept of being easily detectable with the unaided human senses, e.g. such features may be visible and/or detectable via the tactile sense while still being difficult to produce and/or to copy. However, the effectiveness of overt security features depends to a great extent on their easy recognition as a security feature.

Magnetic or magnetizable pigment particles in printing inks or coatings allow for the production of magnetically induced images, designs and/or patterns through the application of a correspondingly structured magnetic field, inducing a local orientation of the magnetic or magnetizable pigment particles in the not yet hardened (i.e. wet) coating, followed by the hardening of the coating. The result is a fixed and stable magnetically induced image, design or pattern. Materials and technologies for the orientation of magnetic or magnetizable pigment particles in coating compositions have been disclosed for example in U.S. Pat. Nos. 2,418,479; 2,570,856; 3,791,864, DE 2006848-A, U.S. Pat. Nos. 3,676,273, 5,364,689, 6,103,361, EP 0 406 667 B1; US 2002/0160194; U.S. Pat. No. 6,871,528; EP 0 710 508 A1; WO 2002/09002 A2; WO 2003/000801 A2; WO 2005/002866 A1; WO 2006/061301 A1. In such a way, magnetically induced patterns which are highly resistant to counterfeit can be produced. The security element in question can only be produced by having access to both, the magnetic or magnetizable pigment particles or the corresponding ink, and the particular technology employed to print said ink and to orient said pigment in the printed ink.

The methods and devices described hereabove use magnetic assemblies to mono-axially orient platelet-shaped magnetic pigment particles. Mono-axial orientation of magnetic pigment particles result in neighboring particles having their main axis parallel to each other and to the magnetic field, while their minor axis in the plane of the pigment particles is not, or much less constrained by the applied magnetic field.

With the aim of producing coatings or layers comprising bi-axially oriented magnetic or magnetizable pigment particles, methods for generating time-dependent, direction-variable magnetic fields of sufficient intensity have been developed thus allowing the bis-axial orientation of magnetic or magnetizable pigment particles.

WO 2015/086257 A1 discloses an improved method for producing an optical effect layer (OEL) on a substrate, said process comprising two magnetic orientation steps, said steps consisting of i) exposing a coating composition comprising platelet-shaped magnetic or magnetisable pigment particles to a dynamic, i.e. direction changing, magnetic field of a first magnetic-field-generating device so as to bi-axially orient at least a part of the platelet-shaped magnetic or magnetisable pigment particles and ii) exposing the coating composition to a static magnetic field of a second magnetic-field-generating device, thereby mono-axially re-orienting at least a part of the platelet-shaped magnetic or magnetisable pigment particles according to a design transferred by said second magnetic-field-generating device. Whereas the method disclosed in WO 2015/086257 A1 allows the production of optical effects layers exhibiting improved brightness and contrast compared to the prior art, said process requires two independent steps, wherein the first step requires additional space for the pre-alignment of the magnetic or magnetizable pigment particles. This requirement is cumbersome to be implemented in a high-speed industrial printing equipment since it requires additional space which is not easily accessible on currently printing equipments thus leading to the adaptation of the currently available used equipments and high costs.

Therefore, a need remains for improved processes for producing optical effect layers (OELs), said methods being mechanically robust, easy to implement with an industrial high-speed printing equipment, in particular rotating magnetic orienting cylinders, without resorting to cumbersome, tedious and expensive modifications of said equipment.

SUMMARY OF THE INVENTION

Accordingly, it is an object of the present invention to overcome the deficiencies of the prior art. This is achieved by the provision of a process for producing an optical effect layer (OEL) on a substrate (x10), said process comprising the steps of:

a) applying onto a substrate (x10) surface a coating composition comprising platelet-shaped magnetic or magnetizable pigment particles so as to form a coating layer (x20) on said substrate (x10), said coating composition being in a first state, b) placing the substrate (x10) carrying the coating layer (x20) on a first magnetic-field-generating device (x30) providing a first magnetic field vector component, said first magnetic-field-generating device (x30) being mounted on a transferring device (TD) thereby subjecting the platelet-shaped magnetic or magnetisable pigment particles to said first magnetic field vector component, concomitantly moving said substrate (x10) carrying the coating layer (x20) and said first magnetic-field-generating device (x30) in the vicinity of a static second magnetic-field-generating device (x40), said second magnetic-field-generating device (x40) providing a second magnetic field vector component thereby subjecting the platelet-shaped magnetic or magnetisable pigment particles to a time-dependent resultant magnetic field formed by the first and second magnetic field vector components so as to bi-axially orient at least a part of the platelet-shaped magnetic or magnetizable pigment particles, and c) hardening the coating composition to a second state so as to fix the platelet-shaped magnetic or magnetizable pigment particles in their adopted positions and orientations.

Also described herein are optical effect layers (OELs) produced by the process described herein and security documents as well as decorative elements and objects comprising one or more optical OELs described herein.

Also described herein are methods of manufacturing a security document or a decorative element or object, comprising a) providing a security document or a decorative element or object, and b) providing an optical effect layer such as those described herein, in particular such as those obtained by the process described herein, so that it is comprised in the security document or decorative element or object.

Also described herein are printing apparatuses comprising the transferring device (TD) described herein, preferably the rotating magnetic cylinder (RMC) described herein, and at least one of the second magnetic-field-generating devices (x40) described herein, said transferring device (TD), preferably said rotating magnetic cylinder (RMC) comprising at least one of the first magnetic-field-generating devices (x30) described herein and mounted thereon.

Also described herein are uses of the printing apparatuses for producing the optical effect layers (OELs) described herein.

The process provided by the present invention is mechanically robust, easy to implement with an industrial high-speed printing equipment, without resorting to cumbersome, tedious and expensive modifications of said equipment.

BRIEF DESCRIPTION OF DRAWINGS

The optical effect layers (OEL) described herein and their production are now described in more detail with reference to the drawings and to particular embodiments, wherein FIG. 1 schematically illustrates the exposure of a substrate (110) carrying a coating layer (120) to i) a first magnetic-field-generating device (130) being mounted on a transferring device (TD), in particular a rotating magnetic cylinder (RMC) and ii) a static second magnetic magnetic-field-generating device (140), where the substrate (110) carrying a coating layer (120) concomitantly moves with the first magnetic-field-generating device (130) in the vicinity of the static second magnetic field generating device (140). The coating layer (120) is hardened with a hardening unit (150) so as to form an optical effect layer (OEL).

FIG. 4B schematically illustrates a cross-section of the first and second magnetic-field-generating devices (430, 440) of FIG. 4A. The bar dipole of the first magnetic-field-generating device (430) is comprised in a holder (431), wherein said holder is placed on top of a supporting block (432) and a rail (433). The two dipole bar magnets (441a and 441b) of the second magnetic-field-generating device (440) are inserted in two holders (442a and 442b) fixed on a frame (443a-c).

DETAILED DESCRIPTION

Definitions

Figures 1, 2:
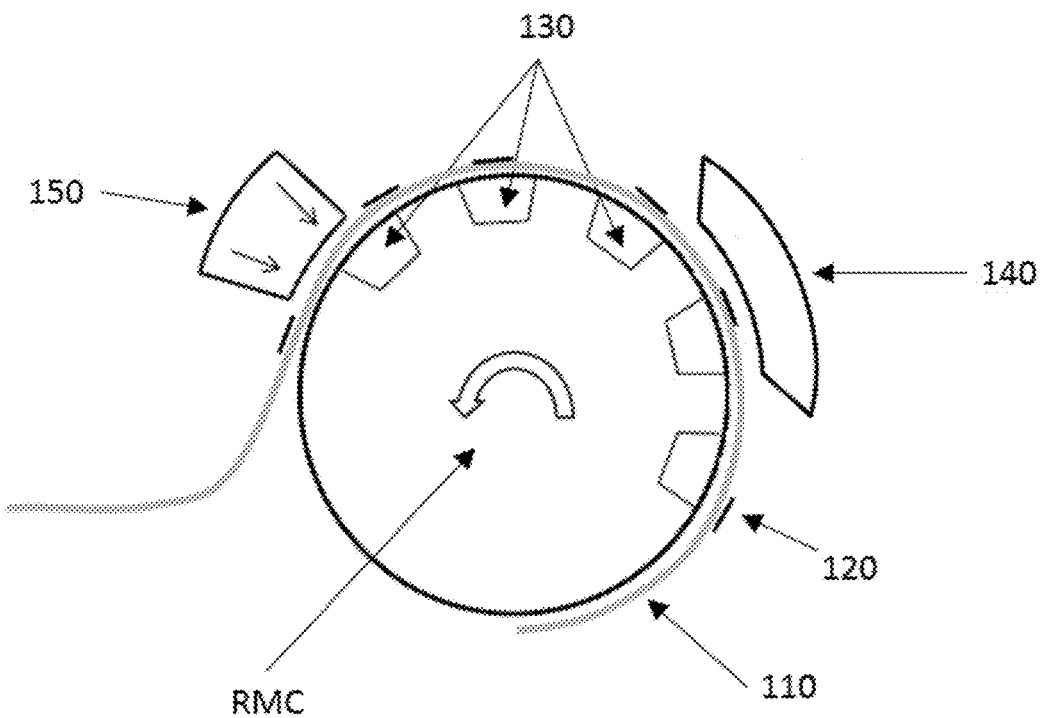
FIG. 2 schematically illustrates a top view of a combination comprising a first magnetic field generating device (230) providing a first time-independent magnetic field vector component and a static second magnetic field generating device (240) providing a second magnetic field vector component. The first magnetic field generating device (230) being a bar dipole magnet which synchronously and concomitantly moves with a substrate (210) carrying a coating layer (220) (not shown in FIG. 2) in the vicinity of the second magnetic field generating device (240).

The following definitions are to be used to interpret the meaning of the terms discussed in the description and recited in the claims.

As used herein, the indefinite article "a" indicates one as well as more than one and does not necessarily limit its referent noun to the singular.

As used herein, the term "at least" is meant to define one or more than one, for example one or two or three.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a coating composition comprising a compound A may include other compounds besides A. However, the term "comprising" also covers, as a particular embodiment thereof, the more restrictive meanings of "consisting essentially of" and "consisting of", so that for instance "a coating composition comprising A, B and optionally C" may also (essentially) consist of A and B, or (essentially) consist of A, B and C.

The term "optical effect layer (OEL)" as used herein denotes a coating or layer that comprises oriented platelet-shaped magnetic or magnetizable pigment particles and a binder, wherein said platelet-shaped magnetic or magnetizable pigment particles are oriented by a magnetic field and wherein the oriented platelet-shaped magnetic or magnetizable pigment particles are fixed/frozen in their orientation and position (i.e. after hardening/curing) so as to form a magnetically induced image.

The term "coating composition" refers to any composition which is capable of forming an optical effect layer (EOL) on a solid substrate and which can be applied preferably but not exclusively by a printing method. The coating composition comprises the platelet-shaped magnetic or magnetizable pigment particles described herein and the binder described herein.

As used herein, the term "wet" refers to a coating layer which is not yet cured, for example a coating in which the platelet-shaped magnetic or magnetizable pigment particles are still able to change their positions and orientations under the influence of external forces acting upon them.

As used herein, the term "indicia" shall mean discontinuous layers such as patterns, including without limitation symbols, alphanumeric symbols, motifs, letters, words, numbers, logos and drawings.

The term "hardening" is used to denote a process wherein the viscosity of a coating composition in a first physical state which is not yet hardened (i.e. wet) is increased so as to convert it into a second physical state, i.e. a hardened or solid state, where the platelet-shaped magnetic or magnetizable pigment particles are fixed/frozen in their current positions and orientations and can no longer move nor rotate.

The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

Where the present description refers to "preferred" embodiments/features, combinations of these "preferred" embodiments/features shall also be deemed as disclosed as long as this combination of "preferred" embodiments/features is technically meaningful.

The present invention provides processes for producing optical effect layers (OEL) on substrates. The process according to the present invention comprises the steps of:
a) applying onto the substrate (x10) surface described herein the coating composition comprising platelet-shaped magnetic or magnetizable pigment particles described herein so as to form the coating layer (x20) described herein on said substrate (x10), said coating composition being in a first state,
b) placing the substrate (x10) carrying the coating layer (x20) on the first magnetic-field-generating device (x30) described herein and providing the first magnetic field vector component described herein, said first magnetic-field-generating device (x30) being mounted on a transferring device (TD) thereby subjecting the platelet-shaped magnetic or magnetisable pigment particles to said first magnetic field vector component,
concomitantly moving said substrate (x10) carrying the coating layer (x20) and said first magnetic-field-generating device (x30) in the vicinity of the static (i.e. not moving with the transferring device (TD)), second magnetic-field-generating device (x40) described herein, said second magnetic-field-generating device (x40) providing the second magnetic field vector component described herein
thereby subjecting the platelet-shaped magnetic or magnetisable pigment particles to the time-dependent resultant magnetic field formed by the first and second magnetic field vector components described herein so as to bi-axially orient at least a part of the platelet-shaped magnetic or magnetizable pigment particles, and
c) hardening the coating composition to a second state so as to fix the platelet-shaped magnetic or magnetizable pigment particles in their adopted positions and orientations.

The present invention provides a reliable and easy to implement process to produce optical effect layers (OEL). The magnetic orientation of the platelet-shaped magnetic or magnetizable pigment particles on the substrate is carried out by placing the substrate (x10) carrying the coating layer (x20) comprising said platelet-shaped magnetic or magnetizable pigment particles on the first magnetic-field-generating device (x30) being mounted on the transferring device (TD) described herein, preferably the rotating magnetic cylinder (RMC) described herein, and submitting them to the static second magnetic-field-generating device, wherein the first magnetic-field-generating device (x30) and the substrate (x10) carrying the coating layer (x20) concomitantly move with the first magnetic-field-generating device (x30) and with the transferring device (TD) and wherein said second magnetic-field-generating device is a static device, i.e. does not move with the transferring device (TD).

Since the substrate (x10) carrying the coating layer (x20) concomitantly moves with the first magnetic-field-generating device (x30), said first magnetic-field-generating device (x30) providing a first time-independent magnetic field vector component, the platelet-shaped magnetic or magnetisable pigment particles are subjected to said first magnetic field vector component, wherein said first magnetic field vector component is time-independent in the reference frame of the coating layer, preferably time-independent within a plane which is fixed in the reference frame of the coating layer.

The present invention takes advantage of the synchronous and concomitant movement of the substrate (x10) carrying the coating layer (x20) comprising platelet-shaped magnetic or magnetizable pigment particles with the first magnetic-field-generating device (x30) in the vicinity of the static second magnetic-field-generating device (x40), (i.e. through the magnetic field of the static second magnetic-field-generating device (x40), wherein said second magnetic-field-generating device (x40) does not move with the transferring device (TD) and provides a second magnetic field vector component. The resultant magnetic field formed by the first and second magnetic field vector components allow the bi-axial orientation of at least a part of the platelet-shaped magnetic or magnetizable pigment particles. During the process described herein, the platelet-shaped magnetic or magnetizable pigment particles are subjected to the time-dependent resulting magnetic field that is the vector sum of the first and second magnetic field vector components and move within said inhomogeneous resulting magnetic field. By "time-dependent magnetic field" it is meant that along the path of motion followed by individual platelet-shaped magnetic or magnetizable pigment particles of the coating layer, the magnetic field is time dependent (i.e. time-varying) in direction or time dependent (i.e. time-varying) in direction and intensity in the reference frame of the coating layer, preferably time-dependent (i.e. time-varying) within a plane which is fixed in the reference frame of the coating layer. In this way, at least a part of the platelet-shaped magnetic or magnetizable pigment particles of the coating layer tend to align, resulting in a bi-axial orientation of at least a part of said platelet-shaped magnetic or magnetizable particles, i.e. an orientation in which the two largest principal axes of said platelet-shaped pigment particles are constrained. Once the desired effect is created in the not yet hardened (i.e. wet) coating layer, the coating composition is partly or completely hardened so as to permanently fix/freeze the relative position and orientation of the platelet-shaped magnetic or magnetizable pigment particles in the OEL.

The transferring device (TD) described herein may be a rotating magnetic orienting cylinder (RMC) or a linear magnetic transferring device (LMTD) such as for example a linear guide. Preferably, the transferring device (TD) described herein is a rotating magnetic orienting cylinder (RMC).

As shown in FIG. 1, the first magnetic-field-generating device (x30) described herein is mounted on a transferring device (TD) being a rotating magnetic orienting cylinder (RMC) described herein, wherein said rotating magnetic orienting cylinder (RMC) is part of a rotary, sheet-fed or web-fed industrial printing press that operates at high printing speed in a continuous way, in particular the first magnetic-field-generating device (x30) is mounted on circumferential grooves or transverse grooves of the rotating magnetic cylinder (RMC). The rotating magnetic orienting cylinder (RMC) comprising the first magnetic-field-generating device (x30) described herein is aimed to be used in, or in conjunction with, or being part of a printing or coating equipment comprising the static second magnetic-field-generating device (x40) described herein so as to orient platelet-shaped magnetic or magnetizable pigment particles in the coating layer.

The process described herein comprises a step a) of applying onto the substrate (x10) surface described herein the coating composition comprising platelet-shaped magnetic or magnetizable pigment particles described herein so as to form a coating layer (x20), said coating composition being in a first physical state which allows its application as a layer and which is in a not yet hardened (i.e. wet) state wherein the platelet-shaped magnetic or magnetizable pigment particles can move and rotate within the binder material. Since the coating composition described herein is to be provided on a substrate (x10) surface, the coating composition comprises at least a binder material such as those described herein and the platelet-shaped magnetic or magnetizable pigment particles, wherein said coating composition is in a form that allows its processing on the desired printing or coating equipment. Preferably, said step a) is carried out by a printing process, preferably selected from the group consisting of screen printing, rotogravure printing, flexography printing, inkjet printing and intaglio printing (also referred in the art as engraved copper plate printing and engraved steel die printing), more preferably selected from the group consisting of intaglio printing, screen printing, rotogravure printing and flexography printing and still more preferably selected from the group consisting of intaglio printing, screen printing, rotogravure printing and flexography printing.

Screen printing (also referred in the art as silkscreen printing) is a stencil process wherein an ink is transferred to a surface through a stencil supported by a fine fabric mesh of silk, mono- or multi-filaments made of synthetic fibers such as for example polyamides or polyesters or metal threads stretched tightly on a frame made for example of wood or a metal (e.g. aluminum or stainless steel). Alternatively, the screen-printing mesh may be a chemically etched, a laser-etched, or a galvanically formed porous metal foil, e.g. a stainless steel foil. The pores of the mesh are blocked in the non-image areas and left open in the image area, the image carrier being called the screen. Screen printing might be of the flat-bed or rotary type. Screen printing is further described for example in The Printing ink manual, R. H. Leach and R. J. Pierce, Springer Edition, $5^{th}$ Edition, pages 58-62 and in Printing Technology, J. M. Adams and P. A. Dolin, Delmar Thomson Learning, $5^{th}$ Edition, pages 293-328.

Rotogravure (also referred in the art as gravure) is a printing process wherein the image elements are engraved into the surface of a cylinder. The non-image areas are at a constant original level. Prior to printing, the entire printing plate (non-printing and printing elements) is inked and flooded with ink. Ink is removed from the non-image by a wiper or a blade before printing, so that ink remains only in the cells. The image is transferred from the cells to the substrate by a pressure typically in the range of 2 to 4 bars and by the adhesive forces between the substrate and the ink. The term rotogravure does not encompass intaglio printing processes (also referred in the art as engraved steel die or copper plate printing processes) which rely for example on a different type of ink. More details are provided in "Handbook of print media", Helmut Kipphan, Springer Edition, page 48 and in The Printing ink manual, R. H. Leach and R. J. Pierce, Springer Edition, $5^{th}$ Edition, pages 42-51.

Flexography preferably uses a unit with a doctor blade, preferably a chambered doctor blade, an anilox roller and plate cylinder. The anilox roller advantageously has small cells whose volume and/or density determines the ink application rate. The doctor blade lies against the anilox roller, and scraps off surplus ink at the same time. The anilox roller transfers the ink to the plate cylinder which finally transfers the ink to the substrate. Specific design might be achieved using a designed photopolymer plate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the nonimage areas, which lowers the plate surface in these nonimage areas. After processing, the plate is dried and given a post-exposure dose of UV light to cure the whole plate. Preparation of plate cylinders for flexography is described in Printing Technology, J. M. Adams and P. A. Dolin, Delmar Thomson Learning, $5^{th}$ Edition, pages 359-360 and in The Printing ink manual, R. H. Leach and R. J. Pierce, Springer Edition, $5^{th}$ Edition, pages 33-42.

The coating composition described herein as well as the coating layer (x20) described herein comprise platelet-shaped magnetic or magnetizable pigment particles. Preferably, the platelet-shaped magnetic or magnetizable pigment particles described herein are present in an amount from about 5 wt-% to about 40 wt-%, more preferably about 10 wt-% to about 30 wt-%, the weight percentages being based on the total weight of the coating composition.

In contrast to needle-shaped pigment particles which can be considered as quasi one-dimensional particles, platelet-shaped pigment particles are quasi two-dimensional particles due to the large aspect ratio of their dimensions. Platelet-shaped pigment particle can be considered as a two-dimensional structure wherein the dimensions X and Y are substantially larger than the dimension Z. Platelet-shaped pigment particles are also referred in the art as oblate particles or flakes. Such pigment particles may be described with a main axis X corresponding to their longest dimension crossing the pigment particle and a second axis Y perpendicular to X and crossing the pigment particle. In other words, the XY plane roughly defines the plane formed by the first and second longest dimensions of the pigment particle, the Z dimension being ignored.

The platelet-shaped magnetic or magnetizable pigment particles described herein have, due to their non-spherical shape, non-isotropic reflectivity with respect to incident electromagnetic radiation for which the hardened/cured binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction.

The OEL described herein comprises platelet-shaped magnetic or magnetizable pigment particles that, due to their shape, have non-isotropic reflectivity. In the OELs described herein, the platelet-shaped magnetic or magnetizable pigment particles described herein are dispersed in the coating composition comprising a hardened binder material that fixes the orientation of the platelet-shaped magnetic or magnetizable pigment particles. The binder material is at least in its hardened or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum. Accordingly, the particles contained in the binder material in its hardened or solid state and their orientation-dependent reflectivity can be perceived through the binder material at some wavelengths within this range. Preferably, the hardened binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 µm of the hardened binder material as present in the OEL (not including the platelet-shaped magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the hardened binder material (not including the platelet-shaped magnetic or magnetizable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range.

Suitable examples of platelet-shaped magnetic or magnetizable pigment particles described herein include without limitation pigment particles comprising a magnetic metal selected from the group consisting of cobalt (Co), iron (Fe), and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of platelet-shaped magnetic or magnetizable pigment particles described herein include without limitation pigment particles comprising a magnetic layer M made from one or more of a magnetic metal such as cobalt (Co), iron (Fe), or nickel (Ni); and a magnetic alloy of iron, cobalt or nickel, wherein said magnetic or magnetizable pigment particles may be multilayered structures comprising one or more additional layers. Preferably, the one or more additional layers are layers A independently made from one or more selected from the group consisting of metal fluorides such as magnesium fluoride ($MgF_2$), silicium oxide (SiO), silicium dioxide ($SiO_2$), titanium oxide ($TiO_2$), and aluminum oxide ($Al_2O_3$), more preferably silicium dioxide ($SiO_2$); or layers B independently made from one or more selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation NM multilayer structures, A/M/A multilayer structures, A/M/B multilayer structures, A/B/M/A multilayer structures, A/B/M/B multilayer structures, A/B/M/B/A/multilayer structures, B/M multilayer structures, B/M/B multilayer structures, B/NM/A multilayer structures, B/NM/B multilayer structures, B/A/M/B/A/multilayer structures, wherein the layers A, the magnetic layers M and the layers B are chosen from those described hereabove.

The coating composition described herein may comprise platelet-shaped optically variable magnetic or magnetizable pigment particles, and/or platelet-shaped magnetic or magnetizable pigment particles having no optically variable properties. Preferably, at least a part of the platelet-shaped magnetic or magnetizable pigment particles described herein is constituted by platelet-shaped optically variable magnetic or magnetizable pigment particles. In addition to the overt security provided by the colorshifting property of the optically variable magnetic or magnetizable pigment particles, which allows easily detecting, recognizing and/or discriminating an article or security document carrying an ink, coating composition, or coating layer comprising the optically variable magnetic or magnetizable pigment particles described herein from their possible counterfeits using the unaided human senses, the optical properties of the optically variable magnetic or magnetizable pigment particles may also be used as a machine readable tool for the recognition of the OEL. Thus, the optical properties of the optically variable magnetic or magnetizable pigment particles may simultaneously be used as a covert or semi-covert security feature in an authentication process wherein the optical (e.g. spectral) properties of the pigment particles are analyzed.

The use of platelet-shaped optically variable magnetic or magnetizable pigment particles in coating layers for producing an OEL enhances the significance of the OEL as a security feature in security document applications, because such materials are reserved to the security document printing industry and are not commercially available to the public.

As mentioned above, preferably at least a part of the platelet-shaped magnetic or magnetizable pigment particles is constituted by platelet-shaped optically variable magnetic or magnetizable pigment particles. These are more preferably selected from the group consisting of magnetic thin-film interference pigment particles, magnetic cholesteric liquid crystal pigment particles, interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferably, the reflector layers described herein are independently made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicium oxide (SiO), silicium dioxide ($SiO_2$), titanium oxide ($TiO_2$), aluminum oxide ($Al_2O_3$), more preferably selected from the group consisting of magnesium fluoride ($MgF_2$) and silicium dioxide ($SiO_2$) and still more preferably magnesium fluoride ($MgF_2$). Preferably, the absorber layers are independently made from one or more selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/Ni/Al/MgF_2/Cr$ multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 whose content is hereby incorporated by reference in its entirety.

Magnetic thin film interference pigment particles described herein are typically manufactured by a conventional deposition technique of the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to flakes which have to be further processed by grinding, milling (such as for example jet milling processes) or any suitable method so as to obtain pigment particles of the required size. The resulting product consists of flat flakes with broken edges, irregular shapes and different aspect ratios. Further information on the preparation of suitable magnetic thin film interference pigment particles can be found e.g. in EP 1 710 756 A1 and EP 1 666 546 A1 whose contents are hereby incorporated by reference.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose platelet-shaped cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicium dioxides ($SiO_2$), aluminum oxides ($Al_2O_3$), titanium oxides ($TiO_2$), graphites and mixtures of two or more thereof. Furthermore, one or more additional layers such as coloring layers may be present.

The magnetic or magnetizable pigment particles described herein may be surface treated so as to protect them against any deterioration that may occur in the coating composition and coating layer and/or to facilitate their incorporation in said coating composition and coating layer; typically corrosion inhibitor materials and/or wetting agents may be used.

Further, subsequently to the application of the coating composition described herein on the substrate surface described herein so as to form a coating layer (step a)), the substrate carrying the coating layer is arranged on top of the first magnetic-field-generating device (x30) being mounted on the transferring device (TD) described herein, preferably on the rotating magnetic cylinder (RMC) described herein. The substrate (x10) carrying the coating layer (x20) may be directly arranged on top of the first magnetic-field-generating device (x30), i.e. the substrate is in direct contact with the first magnetic-field-generating device (x30) or a gap may be present between the substrate (x10) and the first magnetic-field-generating device (x30).

Figure 4A:
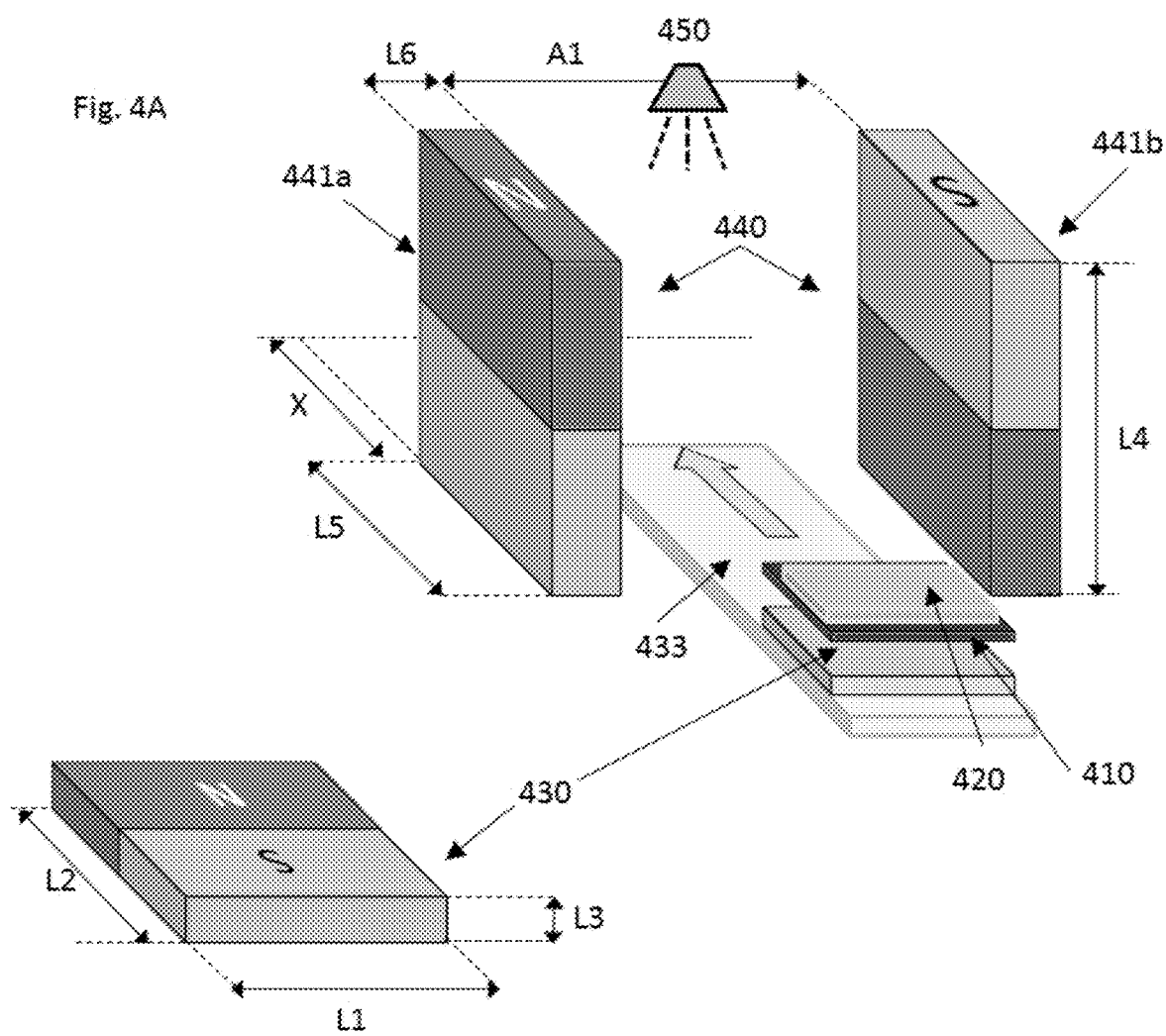
FIG. 4A schematically illustrates a process for the orientation of platelet-shaped magnetic or magnetizable pigment particles comprised in a coating layer (420) on a substrate (410) using a transferring device (TD), in particular a linear magnetic transferring device (LMTD), according to the present invention, said process comprising a step of concomitantly moving (see grey arrow) the substrate (410) carrying the coating layer (420) with a first magnetic-field-generating device (430) in the vicinity of a static second magnetic field generating device (440) comprising two dipole bar magnets (441a and 441b).
Figure 4C:
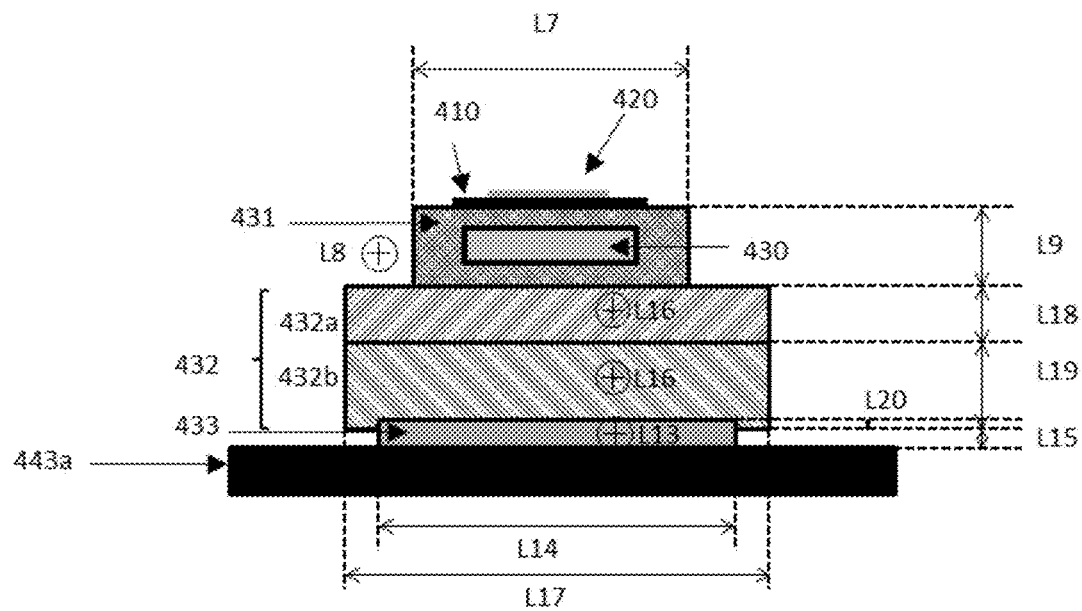
FIG. 4C schematically illustrates a cross-section of the first magnetic-field-generating device (430) of FIG. 4A-B. The first magnetic-field-generating device (430) is comprised in the holder (431) supported by the supporting block (432) and the rail (433) to be moveable in the vicinity of the static second magnetic-field-generating device, wherein the substrate (410) carrying the coating layer (420) is placed on top of said holder (431).

According to one embodiment and as shown in FIG. 4A-C, the substrate (x10) carrying the coating layer (x20) is arranged on top of the first magnetic-field-generating device (x30) with a gap between the substrate (x10) and the first magnetic-field-generating device (x30), wherein said gap may be obtained by using one or more holders, one or more plates or one or more spacers (x31). The holder, the plate or the one or more spacers (x31) is/are independently preferably made from one or more non-magnetic materials selected from the group consisting of low conducting materials, non-conducting materials and mixtures thereof, such as for example engineering plastics and polymers, titanium, titanium alloys and austenitic steels (i.e. non-magnetic steels). Engineering plastics and polymers include without limitation polyaryletherketones (PAEK) and its derivatives polyetheretherketones (PEEK), poletherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetheretherketone), POM (polyoxymethylene), PTFE (polytetrafluoroethylene), Nylon® (polyamide) and PPS. Preferably, the holder, the plate or the one or more spacers (x31) is/are independently made of one more titanium-based materials since said materials have the advantage of excellent mechanical stability and low electric conductivity. The holder, the plate or one or more spacers (x31) may also be made of aluminum or aluminum alloys which have the advantage of being easily worked.

While the substrate (x10) carrying the coating layer (x20) is on top of the first magnetic-field-generating device (x30), said coating layer (x20) is exposed to the magnetic field of the static second magnetic-field-generating device (x40).

The process described herein comprises a step of hardening the coating layer (x20) in a first state to a second state so as to fix/freeze the platelet-shaped magnetic or magnetizable pigment particles in their adopted positions and orientations. The hardening step is carried out by using a hardening unit (x50). The coating composition described herein must thus noteworthy have a first state, i.e. a liquid or pasty state, wherein the coating composition is not yet hardened and wet or soft enough, so that the platelet-shaped magnetic or magnetizable pigment particles dispersed in the coating composition are freely movable, rotatable and orientable upon exposure to a magnetic field, and a second hardened (e.g. solid or solid-like) state, wherein the platelet-shaped magnetic or magnetizable pigment particles are fixed or frozen in their respective positions and orientations.

Such a first and second state is preferably provided by using a certain type of coating composition. For example, the components of the coating composition other than the platelet-shaped magnetic or magnetizable pigment particles may take the form of an ink or coating composition such as those which are used in security applications, e.g. for banknote printing. The aforementioned first and second states can be provided by using a material that shows an increase in viscosity in reaction to a stimulus such as for example a temperature change or an exposure to an electromagnetic radiation. That is, when the fluid binder material is hardened or solidified, said binder material converts into the second state, i.e. a hardened or solid state, where the platelet-shaped magnetic or magnetizable pigment particles are fixed in their current positions and orientations and can no longer move nor rotate within the binder material. As known to those skilled in the art, ingredients comprised in an ink or coating composition to be applied onto a surface such as a substrate and the physical properties of said ink or coating composition must fulfill the requirements of the process used to transfer the ink or coating composition to the substrate surface. Consequently, the binder material comprised in the coating composition described herein is typically chosen among those known in the art and depends on the coating or printing process used to apply the ink or coating composition and the chosen hardening process.

The hardening step generally may be any step that increases the viscosity of the coating composition such that a substantially solid material adhering to the substrate is formed. The hardening step may involve a physical process based on the evaporation of a volatile component, such as a solvent, and/or water evaporation (i.e. physical drying). Herein, hot air, infrared or a combination of hot air and infrared may be used. Alternatively, the hardening process may include a chemical reaction, such as a curing, polymerizing or cross-linking of the binder and optional initiator compounds and/or optional cross-linking compounds comprised in the coating composition. Such a chemical reaction may be initiated by heat or IR irradiation as outlined above for the physical hardening processes, but may preferably include the initiation of a chemical reaction by a radiation mechanism including without limitation Ultraviolet-Visible light radiation curing (hereafter referred as UV-Vis curing) and electronic beam radiation curing (E-beam curing); oxypolymerization (oxidative reticulation, typically induced by a joint action of oxygen and one or more catalysts preferably selected from the group consisting of cobalt-containing catalysts, vanadium-containing catalysts, zirconium-containing catalysts, bismuth-containing catalysts and manganese-containing catalysts); cross-linking reactions or any combination thereof.

The hardening step described herein (step c)) can be of purely physical nature, e.g. in cases where the coating composition comprises a polymeric binder material and a solvent and is applied at high temperatures. Then, the platelet-shaped magnetic or magnetizable pigment particles are oriented at high temperature by the application of a magnetic field, and the solvent is evaporated, followed by cooling of the coating composition. Thereby the coating composition is hardened and the orientation of the pigment particles is fixed.

Alternatively and preferably, the hardening of the coating composition involves a chemical reaction, for instance by curing, which is not reversed by a simple temperature increase (e.g. up to 80° C.) that may occur during a typical use of a security document. The term "curing" or "curable" refers to processes including the chemical reaction, cross-linking or polymerization of at least one component in the applied coating composition in such a manner that it turns into a polymeric material having a greater molecular weight than the starting substances. Preferably, the curing causes the formation of a stable three-dimensional polymeric network. Such a curing is generally induced by applying an external stimulus to the coating composition. Preferably, the coating composition is selected from the group consisting of radiation curable compositions, thermally drying compositions, oxidatively drying compositions, and combinations thereof.

Radiation curing is particularly preferred, and UV-Vis light radiation curing is even more preferred, since these technologies advantageously lead to very fast curing processes and hence drastically decrease the preparation time of any article comprising the OEL described herein. Moreover, radiation curing has the advantage of producing an almost instantaneous increase in viscosity of the coating composition after exposure to the curing radiation, thus minimizing any further movement of the particles. In consequence, any loss of orientation after the magnetic orientation step can essentially be avoided. Particularly preferred is radiation-curing by photo-polymerization, under the influence of actinic light having a wavelength component in the UV or blue part of the electromagnetic spectrum (typically 200 nm to 650 nm; more preferably 200 nm to 420 nm). Equipment for UV-visible-curing may comprise a high-power light-emitting-diode (LED) lamp, or an arc discharge lamp, such as a medium-pressure mercury arc (MPMA) or a metal-vapor arc lamp, as the source of the actinic radiation. Accordingly, particularly preferred are coating compositions selected from the group consisting of radiation curable compositions. Radiation curing, in particular UV-Vis curing, advantageously leads to an instantaneous increase in viscosity of the coating composition after exposure to the irradiation, thus preventing any further movement of the pigment particles and in consequence any loss of information after the magnetic orientation step. Preferably, the hardening step (step c)) is carried out by irradiation with UV-visible light (i.e. UV-Vis light radiation curing) or by E-beam (i.e. E-beam radiation curing), more preferably by irradiation with UV-Vis light.

Therefore, suitable coating compositions for the present invention include radiation curable compositions that may be cured by UV-visible light radiation (hereafter referred as UV-Vis-curable) or by E-beam radiation (hereafter referred as EB). According to one particularly preferred embodiment of the present invention, the coating composition described herein is a UV-Vis-curable coating composition. UV-Vis curing advantageously allows very fast curing processes and hence drastically decreases the preparation time of the OEL described herein, documents and articles and documents comprising said OEL.

Preferably, the UV-Vis-curable coating composition comprises one or more compounds selected from the group consisting of radically curable compounds and cationically curable compounds. The UV-Vis-curable coating composition described herein may be a hybrid system and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby harden the coating composition. Radically curable compounds are cured by free radical mechanisms typically including the activation by radiation of one or more photoinitiators, thereby generating radicals which in turn initiate the polymerization so as to harden the coating composition. Depending on the monomers, oligomers or prepolymers used to prepare the binder comprised in the UV-Vis-curable coating compositions described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diaryl iodonium salts), oxonium (e.g. triaryloxonium salts) and sulfonium salts (e.g. triarylsulphonium salts), as well as mixtures of two or more thereof. Other examples of useful photoinitiators can be found in standard textbooks. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis-curable coating compositions are preferably present in a total amount from about 0.1 wt-% to about 20 wt-%, more preferably about 1 wt-% to about 15 wt-%, the weight percents being based on the total weight of the UV-Vis-curable coating compositions.

Alternatively, a polymeric thermoplastic binder material or a thermoset may be employed. Unlike thermosets, thermoplastic resins can be repeatedly melted and solidified by heating and cooling without incurring any important changes in properties. Typical examples of thermoplastic resin or polymer include without limitation polyamides, polyesters, polyacetals, polyolefins, styrenic polymers, polycarbonates, polyarylates, polyimides, polyether ether ketones (PEEK), polyetherketeoneketones (PEKK), polyphenylene based resins (e.g. polyphenylenethers, polyphenylene oxides, polyphenylene sulfides), polysulphones and mixtures of two or more thereof.

The process for producing the OEL described herein comprises partially simultaneously with step b) or subsequently to step b), preferably partially simultaneously, a step of hardening (step c)) the coating composition. The step of hardening the coating composition allows the platelet-shaped magnetic or magnetizable pigment particles to be fixed in their adopted positions and orientations in a desired pattern to form the OEL, thereby transforming the coating composition to the second state described herein. However, the time from the end of step b) to the beginning of step c) is preferably relatively short in order to avoid any de-orientation and loss of information. Typically, the time between the end of step b) and the beginning of step c) is less than 1 minute, preferably less than 20 seconds, further preferably less than 5 seconds. It is particularly preferable that there is essentially no time gap between the end of the orientation step b) and the beginning of the curing step c), i.e. that step c) follows immediately after step b) or already starts while step b) is still in progress (partially simultaneously). By "partially simultaneously", it is meant that both steps are partly performed simultaneously, i.e. the times of performing each of the steps partially overlap. In the context described herein, when hardening is performed partially simultaneously with the step b), it must be understood that hardening becomes effective after the orientation process has started so that the platelet-shaped magnetic or magnetizable pigment particles orient before the complete or partial hardening of the OEL, in particular when the resultant magnetic field (H3) formed by the first and second magnetic field vector components (i.e. resulting from the vector addition of H1 and H2) described herein is greater than zero, preferably greater than 50 mT. As mentioned herein, the hardening step (step c)) may be performed by using different means or processes depending on the binder material comprised in the coating composition that also comprises the platelet-shaped magnetic or magnetizable pigment particles.

The coating composition described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the coating composition in amounts and in forms known in the art, including so-called nano-materials where at least one of the dimensions of the additive is in the range of 1 to 1000 nm.

The coating composition described herein may further comprise one or more additives including without limitation compounds and materials which are used for adjusting physical, rheological and chemical parameters of the composition such as the viscosity (e.g. solvents and surfactants), the consistency (e.g. anti-settling agents, fillers and plasticizers), the foaming properties (e.g. antifoaming agents), the lubricating properties (waxes), UV reactivity and stability (photosensitizers and photostabilizers) and adhesion properties, etc. Additives described herein may be present in the coating compositions described herein in amounts and in forms known in the art, including in the form of so-called nano-materials where at least one of the dimensions of the particles is in the range of 1 to 1000 nm.

The coating composition described herein may further comprise one or more marker substances or taggants and/or one or more machine readable materials selected from the group consisting of magnetic materials (different from the magnetic or magnetizable pigment particles described herein), luminescent materials, electrically conductive materials and infrared-absorbing materials. As used herein, the term "machine readable material" refers to a material which exhibits at least one distinctive property which is detectable by a device or a machine, and which can be comprised in a coating so as to confer a way to authenticate said coating or article comprising said coating by the use of a particular equipment for its detection and/or authentication.

The coating compositions described herein may be prepared by dispersing or mixing the magnetic or magnetizable pigment particles described herein and the one or more additives when present in the presence of the binder material described herein, thus forming liquid compositions. When present, the one or more photoinitiators may be added to the composition either during the dispersing or mixing step of all other ingredients or may be added at a later stage, i.e. after the formation of the liquid coating composition.

Figure 3:
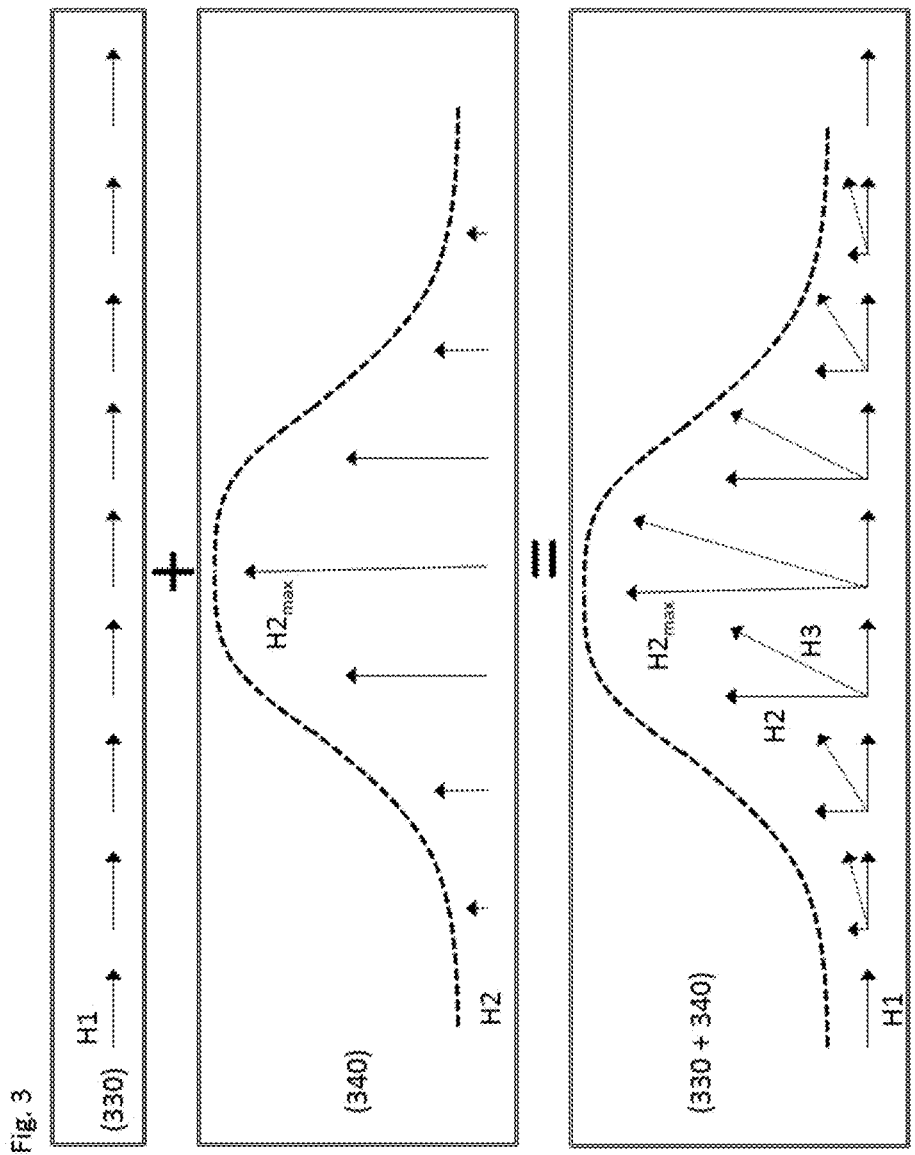
FIG. 3 schematically illustrates the magnetic fields of a first magnetic field generating device (330) providing a first time-independent magnetic field vector component (H1), the magnetic fields of a second magnetic field generating device (340) providing a second magnetic field vector component (H2), and the resultant magnetic field (H3) formed by the first and second magnetic field vector components, i.e. resulting from the vector addition of H1 and H2.

While the substrate (x10) carrying the coating layer (x20) is concomitantly moving with the first magnetic-field-generating device (x30), the process described herein comprises a step of moving them in the vicinity of the static second magnetic-field-generating device (x40) described herein, wherein the substrate (x10) carrying the coating layer (x20) is arranged on top of the first magnetic-field-generating device (x30). As shown in FIGS. 2 and 3, the first magnetic-field-generating device (x30) provides a first magnetic field vector component which is time-independent in the reference frame of the coating layer, preferably time-independent within a plane which is fixed in the reference frame of the coating layer (x20).

The substrate (x10) carrying the coating layer (x20) described herein and the first magnetic-field-generating device (x30) synchronously and concomitantly move in the vicinity of the static (i.e. not moving with the transferring device (TD)), second magnetic-field-generating device (x40) (i.e. through the magnetic field of the static, i.e. not moving with the transferring device (TD) described herein, second magnetic-field-generating device (x40)) providing a second magnetic field vector component which is time-dependent in the reference frame of the coating layer (x20), preferably time-dependent within a plane which is fixed in the reference frame of the coating layer (x20), since the coating layer (x20) is moving in the vicinity of said static second magnetic-field-generating device (x40). The platelet-shaped magnetic or magnetizable pigment particles are thereby subjected/exposed to a resultant magnetic field formed by the first and second magnetic field vector components, said resultant magnetic field being time-dependent (time-varying) in direction or time-dependent (time-varying) in direction and intensity (see FIG. 3), thus bi-axially orienting at least a part of said platelet-shaped magnetic or magnetizable pigment particles while the coating composition is still in a wet (i.e. not yet hardened) state.

As shown in FIG. 3, the first magnetic field vector component (H1) of the first magnetic field generating device (330) is constant over the time in the reference frame of the coating layer and is moving (as illustrated by the series of arrows in FIG. 3) concomitantly and synchronously with the substrate (x10) carrying the coating layer (x20) in the reference frame of second magnetic field generating device. The second magnetic field vector component (H2) of the second magnetic field generating device (340) is substantially non-parallel to the first magnetic field vector component (H1), preferably substantially perpendicular to the first magnetic field vector component (H1) of the of first magnetic field generating device (330). The second magnetic field vector component (H2) of the second magnetic field generating device (340) varies in intensity (alternatively varies in intensity and direction) over the space, the maximum intensity ($H2_{max}$) being in the center of the two dipole bar magnets depicted in FIG. 2. (241a and 241b, FIG. 2). Thus a substrate (x10) carrying a coating layer (x20) moving in the vicinity of the second magnetic field generating device (x40) will be subjected to a timely variable (H2) intensity as a result of the movement of said substrate. When the substrate (x10) carrying the coating layer (x20) and the first magnetic field generating device (330) concomitantly move in the vicinity of the second magnetic field generating device (340), the platelet-shaped magnetic or magnetizable pigment particles comprised in the coating layer (x20) are subjected to the inhomogeneous resultant magnetic field (H3) formed by the first and second magnetic field vector components, i.e. resulting from the vector addition of H1 and H2, i.e. they are subjected to a time-dependent magnetic field which varies at least in direction or varies in direction and intensity (see FIG. 3) in the reference frame of the coating layer, preferably time-dependent within a plane which is fixed in the reference frame of the coating layer thus bi-axially orienting the platelet-shaped magnetic or magnetizable pigment particles of said coating layer (x20).

A large variety of optical effect layers (OELs) for decorative and security applications may be produced with the process described herein. Magnetic-field-generating devices known in the art that allow the mono-axial orientation of the platelet-shaped magnetic or magnetizable pigment particles may be used as first magnetic-field-generating devices (x30) including for example dipole magnets, quadrupolar magnets and combinations thereof. The substrate (x10) carrying the coating layer (x20) described herein concomitantly move with the first magnetic-field-generating device (x30) being mounted on the transferring device (TD) described herein, preferably on the rotating magnetic cylinder (RMC) described herein, in the vicinity of the static second magnetic-field-generating device (x40) and thus through the magnetic field of said second magnetic-field-generating device (x40), wherein said first magnetic-field-generating devices (x30) is not a spinning magnet by itself. Typical examples of suitable first magnetic-field-generating devices (x30) include the devices described herein.

OEL known as flip-flop effects (also referred in the art as switching effect) may be produced. Flip-flop effects include a first printed portion and a second printed portion separated by a transition, wherein pigment particles are aligned parallel to a first plane in the first portion and flakes in the second portion are aligned parallel to a second plane. Methods and magnets for producing flip-flop effects are disclosed for example in U.S. Pat. No. 7,517,578 and EP 1 819 525 B1.

Optical effects known as rolling-bar effects as disclosed in US U.S. Pat. No. 7,517,578 may also be produced. A "rolling bar" effect is based on pigment particles orientation imitating a curved surface across the coating. The observer sees a specular reflection zone which moves away or towards the observer as the image is tilted. The pigment particles are aligned in a curving fashion, either following a convex curvature (also referred in the art as negative curved orientation) or a concave curvature (also referred in the art as positive curved orientation). Methods and magnets for producing rolling-bar effects are disclosed for example in EP 2 263 806 A1, EP 1 674 282 B1, EP 2 263 807 A1, WO 2004/007095 A2, WO 2012/104098 A1, and WO 2014/198905 A2.

Optical effects known as Venetian-blind effects may also be produced. Venetian-blind effects include pigment particles being oriented such that, along a specific direction of observation, they give visibility to an underlying substrate surface, such that indicia or other features present on or in the substrate surface become apparent to the observer while they impede the visibility along another direction of observation. Methods for producing Venetian-blind effects are disclosed for example in U.S. Pat. No. 8,025,952 and EP 1 819 525 B1.

Optical effects known as moving-ring effects may also be produced. Moving-ring effects consists of optically illusive images of objects such as funnels, cones, bowls, circles, ellipses, and hemispheres that appear to move in any x-y direction depending upon the angle of tilt of said optical effect layer. Methods and magnets for producing moving-ring effects are disclosed for example in EP 1 710 756 A1, U.S. Pat. No. 8,343,615, EP 2 306 222 A1, EP 2 325 677 A2, WO 2011/092502 A2 and U.S. Pat. No. 9,257,059.

Optical effects providing an optical impression of a pattern of moving bright and dark areas upon tilting said effect may also be produced. A method and magnets for producing these optical effects are disclosed for example in WO 2013/167425 A1.

Optical effects providing an optical impression of a loop-shaped body having a size that varies upon tilting said effect may also be produced. Methods and magnets for producing these optical effects are disclosed for example in the co-pending Applications EP 15189955.6, EP15193837.0 and EP16157815.8.

Optical effects providing an optical impression of one or more loop-shaped bodies having a shape that varies upon tilting the optical effect layer may also be produced. A method and magnets for producing these optical effects are disclosed for example in the co-pending Application EP16190044.4.

The first magnetic-field-generating device (x30) described herein may comprise a magnetic plate carrying one or more reliefs, engravings or cut-outs. WO 2005/002866 A1 and WO 2008/046702 A1 are examples for such engraved magnetic plates.

Contrary to a mono-axial orientation wherein the platelet-shaped magnetic or magnetizable pigment particles are orientated in such a way that only their main axis is constrained by the magnetic field vector component, carrying out a bi-axial orientation means that the platelet-shaped magnetic or magnetizable pigment particles are made to orient in such a way that both their two main axes X and Y are constrained. Such biaxial orientation is achieved, according to the invention, by exposing/subjecting and moving the substrate (x10) carrying the coating layer (x20) with the first magnetic-field-generating device (x30) described herein to and in the vicinity of the static second magnetic-field generating device (x40) (i.e. through the magnetic field of the static second magnetic-field generating device (x40)). Accordingly, said second magnetic-field generating device (x40) must be configured in such a way that, along the path of motion followed by individual platelet-shaped magnetic or magnetizable pigment particles of the coating layer, the second magnetic field vector component change at least in direction or change in direction and intensity in the reference frame of the coating layer (x20), preferably within a plane which is fixed in the reference frame of the coating layer (x20). Bi-axial orientation aligns the planes of the platelet-shaped magnetic or magnetizable pigment particles so that said planes are oriented to be locally substantially parallel to each other.

Bi-axial orientation of the platelet-shaped magnetic or magnetizable pigment particles may be carried out by concomitantly moving the substrate (x10) carrying the coating layer (x20) with the first magnetic-field-generating device (x30) mounted on the transferring device (TD) described herein, preferably on the rotating magnetic cylinder (RMC) described herein, at an appropriate speed in the vicinity of a static second magnetic-field-generating device (x40) such as those described in EP 2 157 141 A1. Such devices provide a magnetic field that changes its direction while the platelet-shaped magnetic or magnetizable pigment particles move in the vicinity of said devices, forcing the platelet-shaped magnetic or magnetizable pigment particles to rapidly oscillate until both main axes, X-axis and Y-axis, stabilize, i.e. the platelet-shaped magnetic or magnetizable pigment particles oscillate until they reach a stable sheet-like formation with their respective X and Y axes planarized in said two dimensions. As shown in FIG. 5 of EP 2 157 141, the magnetic-field-generating device described herein comprises a linear arrangement of at least three magnets that are positioned in a staggered fashion or in zigzag formation, each of said three magnets having its magnetic axis substantially perpendicular to the substrate (x10) surface and said at least three magnets at the same side of a feedpath have the same at the same side of a feedpath have the same polarity, which is opposed to the polarity of the magnet(s) on the opposing side of the feedpath in a staggered fashion (as shown in the FIG. 5, said at least three magnets at the same side of a feedpath have the same polarity being on opposite sides of a feedpath where magnets at the same side of the feedpath have the same polarity, which is opposed to the polarity of the magnet(s) on the opposing side of the feedpath in a staggered fashion). The arrangement of the at least three magnets provides a predetermined change of the field direction as platelet-shaped magnetic or magnetizable pigment particles in a coating composition move past the magnets (direction of movement: arrow). According to one embodiment, the second magnetic-field-generating device (x40) comprises a) a first magnet and a third magnet on a first side of a feedpath and b) a second magnet between the first and third magnets on a second opposite side of the feedpath, wherein the first and third magnets have a same polarity, wherein the second magnet has a complementary polarity to the first and third magnets and wherein each of said three magnets has its magnetic axis substantially perpendicular to the substrate (x10) surface. According to another embodiment, the second magnetic-field-generating device (x40) further comprises a fourth magnet on the same side of the feedpath as the second magnet, having the polarity of the second magnet and complementary to the polarity of the third magnet, wherein the second magnet has a complementary polarity to the first and third magnets and wherein each of said four magnets has its magnetic axis substantially perpendicular to the substrate (x10) surface. As described in EP 2 157 141 A1, the magnetic-field-generating device can be either underneath the layer comprising the platelet-shaped magnetic or magnetizable pigment particles, or above and underneath.

Carrying out a bi-axial orientation of the platelet-shaped magnetic or magnetizable pigment particles may be carried out by moving the substrate (x10) carrying the coating layer (x20) with the first magnetic-field-generating device (x30) mounted on the transferring device (TD) described herein, preferably on the rotating magnetic cylinder (RMC) described herein, at an appropriate speed in the vicinity of a static second magnetic-field-generating (x40) device being a linear permanent magnet Halbach array or through an arrangement of two or more Halbach arrays disposed in an appropriate arrangement. Linear permanent Halbach arrays consist of assemblies comprising a plurality of magnets with different magnetization directions. Detailed description of Halbach permanent magnets was given by Z. Q. Zhu et D. Howe (Halbach permanent magnet machines and applications: a review, IEE. Proc. Electric Power Appl., 2001, 148, p. 299-308). The magnetic field produced by such a linear permanent magnet Halbach array has the properties that it is concentrated on one side while being weakened almost to zero on the other side. Typically, linear permanent magnet Halbach arrays comprise one or more non-magnetic blocks made for example of wood or plastic, in particular plastics known to exhibit good self-lubricating properties and wear resistance such as polyacetal (also called polyoxymethylene, POM) resins, and magnets made of high-coercivity magnetic materials such as Neodymium-Iron-Boron (NdFeB).

Carrying out a bi-axial orientation of the platelet-shaped magnetic or magnetizable pigment particles may be carried out by moving the substrate (x10) carrying the coating layer (x20) with the first magnetic-field-generating device (x30) mounted on the transferring device (TD) described herein, preferably on the rotating magnetic cylinder (RMC) described herein, at an appropriate speed in the vicinity of a static second magnetic-field-generating device (x40) such as those described in EP 1 519 794 B1. Suitable devices include permanent magnets being disposed on each side of the substrate (x10) carrying the coating layer (x20), above it, such that the magnetic field lines are substantially parallel to the substrate (x10) surface. According to one embodiment, the second magnetic-field-generating device (x40) comprises one or more pairs of two bar dipole magnets, wherein each of said two bar dipole magnets has its magnetic axis substantially parallel to the substrate (x10) surface and wherein the two bar dipole magnets have an opposite magnetic direction. According to another embodiment and as depicted in FIG. 4A-B, the second magnetic-field-generating device (x40) comprises one or more pairs of two bar dipole magnets (x41a, x41b), wherein each of said two bar dipole magnets has its magnetic axis substantially perpendicular to the substrate (x10) surface and wherein the two bar dipole magnets have an opposite magnetic direction. According to another embodiment, instead of comprising one or more pairs of two bar dipole magnets, wherein each of said two bar dipole magnets has its magnetic axis substantially perpendicular to the substrate (x10) surface and wherein the two bar dipole magnets have an opposite magnetic direction, the second magnetic-field-generating device (x40) comprises a U-shaped magnet (also referred in the art as horseshoe magnet) having both a North and a South pole located in the same plane at the open end of the magnet. The U-shaped magnet may be a single piece or may be built up from two separate pieces, wherein said two separate pieces may be in direct contact or may be spaced apart and connected together with a non-magnetic base.

The second magnetic-field-generating device (x40) may be comprised in one or more holders (x42). The one or more holders (x42) described herein are preferably made from the one or more non-magnetic materials described herein for the one or more holders, the one or more plates or the one or more spacers (x31) described herein.

As described hereabove, the so-oriented platelet-shaped magnetic or magnetizable pigment particles are fixed/frozen in their orientation and position (i.e. after hardening) so as to form an optical effect layer (OEL). As shown in FIG. 1A, the hardening step described herein (step c)) is preferably carried out with a hardening unit (x50) while the substrate (x10) carrying the coating layer (x20) described herein is still on top of the first magnetic-field-generating device (x30) and while the substrate (x10) carrying the coating layer (x20) described herein is not moving in the vicinity of the static second magnetic-field-generating device (x40) any more, i.e. the hardening step described herein is carried out partially simultaneously with the step b), when the resultant magnetic field (H3) formed by the first and second magnetic field vector components (i.e. resulting from the vector addition of H1 and H2) described herein is greater than zero, preferably greater than 50 mT.

FIG. 4A-C schematically depict an embodiment of a process for the orientation of platelet-shaped magnetic or magnetizable pigment particles comprised in a coating layer (x20) on a substrate (x10) using a transferring device (TD) being a linear magnetic transferring device (LMTD) according to the present invention. Instead of mounting the first magnetic-field-generating device (x30) to a rotating magnetic orienting cylinder (RMC), said first magnetic-field-generating device (x30) is movable (see grey arrow) for example with the help of a rail (x33) in the vicinity of the static second magnetic field generating device (x40). As shown in FIG. 4A-C, the process described herein uses a movable first magnetic field generating device (430) and a static second magnetic field generating device (440) such as described herein.

In an embodiment shown in FIG. 4A-C, the first magnetic field generating device (430) consists of a bar dipole magnet having its South-North magnetic axis substantially parallel to the substrate (410) surface, having its North pole pointing towards the second magnetic field generating device (440) and being disposed in a non-magnetic holder (431). The non-magnetic holder (431) comprising the first magnetic field generating device (430) is arranged on top of a supporting block (432) and a rail (433) so as to be moveable.

In an embodiment shown in FIG. 4A-C, the second magnetic field generating device (440) consists of two bar dipole magnets (441a and 441b), wherein said two bar dipole magnets (441a and 441b) are independently inserted in non-magnetic holders (442a and 442b) fixed to a non-magnetic frame (443), wherein said two bar dipole magnets (441a and 441b) have their South-North magnetic field direction opposite to each other (one bar dipole magnet (441a) have its South pole facing the substrate (410) surface and the other (441b) having its North pole facing the substrate (410) surface), wherein each of said two bar dipole magnets (441a and 441b) has its South-North magnetic axis perpendicular to the substrate (410) surface (i.e. its South-North magnetic axis substantially perpendicular to South-North magnetic axis of the first magnetic field generating device (430) surface) and wherein said two bar dipole magnets (441a and 441b) are spaced apart by a distance A1.

Preferably, the surface of the substrate (410) carrying the coating layer (420) is flush with the bottom surface of the two bar dipole magnets (441a and 441b). Preferably, the center of the coating layer (420) is placed on the center of the first magnetic field generating device (430) and is placed at an equal distance between the two bar dipole magnets (441a and 441b) of the second magnetic field generating device (440), i.e. at a distance ½ A1 from each bar dipole magnets (441a and 441b).

As shown in FIG. 4A, the hardening step described herein is preferably carried out while the substrate (410) carrying the coating composition (420) herein is still on top of the first magnetic-field-generating device (430) and while the substrate (410) and the first magnetic-field-generating device (430) have moved at a distance (X) away from the static second magnetic field generating device (440) in the direction of the movement.

The present invention further provides printing apparatuses and the uses thereof for producing the optical effect layers (OELs) described herein. The printing apparatuses described herein comprises the transferring device (TD) described herein, preferably the rotating magnetic cylinder (RMC) described herein, and at least one of the second magnetic-field-generating devices (x40) described herein, wherein the transferring device (TD) described herein, preferably the rotating magnetic cylinder (RMC) described herein, comprises at least one of the first magnetic-field-generating devices (x30) described herein, wherein said at least one of the first magnetic-field-generating devices (x30) described herein is mounted on said transferring device (TD) described herein. Preferably, the printing apparatuses described herein comprises the rotating magnetic cylinder (RMC) described herein and at least one of the second magnetic-field-generating devices (x40) described herein, wherein the rotating magnetic cylinder (RMC) described herein comprises at least one of the first magnetic-field-generating devices (x30) described herein, wherein said at least one of the first magnetic-field-generating devices (x30) described herein is preferably mounted on circumferential grooves or transverse grooves of the rotating magnetic cylinder (RMC). In an embodiment, the rotating magnetic cylinder (RMC) is part of a rotary, sheet-fed or web-fed industrial printing press that operates at high printing speed in a continuous way.

The transferring device (TD), preferably the rotating magnetic cylinder (RMC), comprising at least one of the first magnetic-field-generating devices (x30) mounted thereon as well as the at least one of the second magnetic-field-generating devices (x40) described herein are meant to be used in, or in conjunction with, or being part of a printing or coating equipment. In an embodiment, the transferring device (TD) is a rotating magnetic cylinder (RMC) such as those described herein, wherein said rotating magnetic cylinder (RMC) is preferably part of a rotary, sheet-fed or web-fed industrial printing press that operates at high printing speed in a continuous way.

The printing apparatuses comprising the transferring device (TD) described herein, preferably the rotating magnetic cylinder (RMC) described herein, comprising at least one of the first magnetic-field-generating devices (x30) described herein as well as the at least one of the second magnetic-field-generating devices (x40) described herein may include a substrate feeder for feeding a substrate such as those described herein having thereon a layer of platelet-shaped magnetic or magnetizable pigment particles described herein, so that the first magnetic-field-generating device (x30) and the second first magnetic-field-generating device (x40) generate a resultant magnetic field that acts on the pigment particles to orient them to form an optical effect layer (OEL). In an embodiment of the printing apparatuses comprising the transferring device (TD) described herein, preferably the rotating magnetic cylinder (RMC) described herein, the substrate is fed by the substrate feeder under the form of sheets or a web.

The printing apparatuses comprising the transferring device (TD) described herein, preferably the rotating magnetic cylinder (RMC) described herein, comprising at least one of the first magnetic-field-generating devices (x30) described herein as well as the at least one of the second magnetic-field-generating devices (x40) described herein may include a substrate-guiding system. As used herein, a "substrate-guiding system" refers to a set-up that holds the substrate (x10) carrying the coating layer (x10) in close contact with the transferring device (TD) described herein, preferably the rotating magnetic cylinder (RMC) described herein, and the first magnetic-field-generating devices (x30). The substrate-guiding system may be a gripper and/or a vacuum system. Particularly, the gripper may serve the purpose of holding the leading edge of the substrate (x10) and allowing the (x10) to be transferred from one part of the printing machine to the next, and the vacuum system may serve to pull the surface of the (x10) against the surface of the transferring device (TD) described herein, preferably the rotating magnetic cylinder (RMC) described herein, and the first magnetic-field-generating devices (x30) and maintain it firmly aligned therewith. The substrate-guiding system may comprise, in addition to or instead of the gripper and/or the vacuum system other pieces of substrate-guiding equipment including without limitation a roller or a set of rollers, a brush or a set of brushes, a belt and/or a set of belts, a blade or a set of blades, or a spring or a set of springs.

The printing apparatuses comprising the transferring device (TD) described herein, preferably the rotating magnetic cylinder (RMC) described herein, comprising at least one of the first magnetic-field-generating devices (x30) described herein as well as the at least one of the second magnetic-field-generating devices (x40) described herein may include a coating or printing unit for applying the coating composition comprising the platelet-shaped magnetic or magnetizable pigment particles described herein on the substrate (x10) described herein so as to form the coating layer (x20) described herein.

The printing apparatuses comprising the transferring device (TD) described herein, preferably the rotating magnetic cylinder (RMC) described herein, comprising at least one of the first magnetic-field-generating devices (x30) described herein as well as the at least one of the second magnetic-field-generating devices (x40) described herein may include a hardening unit (x50), preferably a curing unit, for at least partially hardening the coating layer (x20) comprising platelet-shaped magnetic or magnetizable pigment particles that have been magnetically oriented by the resultant magnetic field formed by the first and second magnetic field vector components of the first and second magnetic-field-generating devices (x30 and x40) described herein, thereby fixing the orientation and position of the platelet-shaped magnetic or magnetizable pigment particles to produce an optical effect layer (OEL).

The present invention provides the processes described herein and the printing apparatuses described herein to produce an optical effect layer (OEL) on the substrate (x10) described herein. The substrate (x10) described herein is preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc. When the OELs produced according to the present invention are used for decorative or cosmetic purposes including for example fingernail lacquers, said OEL may be produced on other type of substrates including nails, artificial nails or other parts of an animal or human being.

Should the OEL produced according to the present invention be on a security document, and with the aim of further increasing the security level and the resistance against counterfeiting and illegal reproduction of said security document, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

If desired, a primer layer may be applied to the substrate prior to the step a). This may enhance the quality of the optical effect layer (OEL) described herein or promote adhesion. Examples of such primer layers may be found in WO 2010/058026 A2.

With the aim of increasing the durability through soiling or chemical resistance and cleanliness and thus the circulation lifetime of an article, a security document or a decorative element or object comprising the optical effect layer (OEL) obtained by the process described herein, or with the aim of modifying their aesthetical appearance (e.g. optical gloss), one or more protective layers may be applied on top of the optical effect layer (OEL). When present, the one or more protective layers are typically made of protective varnishes. Protective varnishes may be radiation curable compositions, thermal drying compositions or any combination thereof. Preferably, the one or more protective layers are radiation curable compositions, more preferable UV-Vis curable compositions. The protective layers are typically applied after the formation of the optical effect layer (OEL).

The present invention further provides optical effect layers (OEL) produced by the process described herein and/or by using the printing apparatus described herein.

The optical effect layer (OEL) described herein may be provided directly on a substrate on which it shall remain permanently (such as for banknote applications). Alternatively, an optical effect layer (OEL) may also be provided on a temporary substrate for production purposes, from which the OEL is subsequently removed. This may for example facilitate the production of the optical effect layer (OEL), particularly while the binder material is still in its fluid state. Thereafter, after hardening the coating composition for the production of the optical effect layer (OEL), the temporary substrate may be removed from the OEL.

Alternatively, in another embodiment an adhesive layer may be present on the optical effect layer (OEL) or may be present on the substrate comprising OEL, said adhesive layer being on the side of the substrate opposite to the side where the OEL is provided or on the same side as the OEL and on top of the OEL. Therefore an adhesive layer may be applied to the optical effect layer (OEL) or to the substrate, said adhesive layer being applied after the curing step has been completed. Such an article may be attached to all kinds of documents or other articles or items without printing or other processes involving machinery and rather high effort. Alternatively, the substrate described herein comprising the optical effect layer (OEL) described herein may be in the form of a transfer foil, which can be applied to a document or to an article in a separate transfer step. For this purpose, the substrate is provided with a release coating, on which the optical effect layer (OEL) are produced as described herein. One or more adhesive layers may be applied over the so produced optical effect layer (OEL).

Also described herein are substrates comprising more than one, i.e. two, three, four, etc. optical effect layers (OEL) obtained by the process described herein.

Also described herein are articles, in particular security documents, decorative elements or objects, comprising the optical effect layer (OEL) produced according to the present invention. The articles, in particular security documents, decorative elements or objects, may comprise more than one (for example two, three, etc.) OELs produced according to the present invention.

As mentioned hereabove, the optical effect layer (OEL) produced according to the present invention may be used for decorative purposes as well as for protecting and authenticating a security document.

Typical examples of decorative elements or objects include without limitation luxury goods, cosmetic packaging, automotive parts, electronic/electrical appliances, furniture and fingernail articles.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets, academic diploma or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) may be produced onto an auxiliary substrate such as for example a security thread, security stripe, a foil, a decal, a window or a label and consequently transferred to a security document in a separate step.

The skilled person can envisage several modifications to the specific embodiments described above without departing from the spirit of the present invention. Such modifications are encompasses by the present invention.

Further, all documents referred to throughout this specification are hereby incorporated by reference in their entirety as set forth in full herein.

EXAMPLES

The Examples have been carried out by using the UV-curable screen printing ink of the formula given in Table 1 and the first and second magnetic-field-generating devices described herebelow.

TABLE 1

| | |
|---|---|
| Epoxyacrylate oligomer | 28 wt-% |
| Trimethylolpropane triacrylate monomer | 19.5 wt-% |
| Tripropyleneglycol diacrylate monomer | 20 wt-% |
| Genorad 16 (Rahn) | 1 wt-% |
| Aerosil 200 (Evonik) | 1 wt-% |
| Speedcure TPO-L (Lambson) | 2 wt-% |
| Irgacure ® 500 (BASF) | 6 wt-% |
| Genocure ® EPD (Rahn) | 2 wt-% |

TABLE 1-continued

| BYK ® 371 (BYK) | 2 wt-% |
| Tego Foamex N (Evonik) | 2 wt-% |
| 7-layer optically variable magnetic pigment particles (*) | 16.5 wt-% |

(*) 7-layer gold-to-green platelet-shaped optically variable magnetic pigment particles having a flake shape of diameter $d_{50}$ about 9.3 µm and thickness about 1 µm, obtained from JDS-Uniphase, Santa Rosa, CA.

First Magnetic-Field-Generating Device (FIG. 4A-C, not at Scale)

A bar dipole magnet (430) made of NdFeB N40 was used as the first magnetic field generating device. The bar dipole magnet (430) had the following dimensions: 30 mm (L1)×18 mm (L2)×6 mm (L3). As shown in FIG. 4B-C, the bar dipole magnet (430) was embedded in a non-magnetic holder (431) made of high density polyethylene (HDPE) and having the following dimensions: 40 mm (L7)×40 mm (L8)×25 mm (L9). The top surface of the bar dipole magnet (430) was placed at a distance (A2) of about 15 mm from the top surface of the non-magnetic holder (431).

As shown in FIG. 4B-C, the bar dipole magnet (430) embedded in the non-magnetic holder (431) was movable in the vicinity of the static second magnetic field generating device (440) (i.e. through the magnetic field of the second magnetic field generating device (440)) with the help of a supporting block (432) and a rail (433), wherein said rail (433) was fixed to a frame (443).

The rail (433) (from ThorLabs) was made of anodized aluminum and had the following dimensions: 448 mm (L13)×40 mm (L14)×10 mm (L15).

The supporting block (432) comprised a first piece (432a), a second piece (432b). The first piece (432a) was made of anodized aluminum (Aluminum Breadoard from ThorLabs) and had the following dimensions: 112 mm (L16)×65 mm (L17)×13 mm (L18) and was glued on top of the second piece (432b). The second piece (432b) was made of high density polyethylene (HDPE), had the following dimensions: 112 mm (L16)×65 mm (L17)×37 mm (L19) and comprised a recess suitable to dispose the second piece (432b) on the rail (433) and having the following dimensions: 65 mm (L17)×40 mm (L14)×5 mm (L20).

The supporting block (432) made of the two pieces (432a-b) was disposed on the rail (433) so as to be moveable by gliding on said rail (433) along its length (see FIG. 4A).

Second Magnetic-Field-Generating Device (FIG. 4A-4B, not at Scale)

A pair of two bar dipole magnets (441a and 441b) was used as the second magnetic field generating device (440). Each of the two bar dipole magnets (441a and 441b) had the following dimensions: 48 mm (L4)×24 mm (L5)×10 mm (L6) and was made of NdFeB N40. The magnetic axis of each of the two bar dipole magnets (441a and 441b) was substantially parallel to the length (L4) of said magnets (i.e. substantially perpendicular to the substrate (410) surface), the magnetic direction of the first of said two bar dipole magnets (441a) being opposite to the magnetic direction of the second of said two bar dipole magnets (441b). The two dipole bar magnets (441a and 441b) were located at a distance (A1=48 mm) from each other and were independently embedded in a pair of non-magnetic holder (442a and 442b) made of polyoxymethylene (POM).

As shown in FIG. 4B, the pair of non-magnetic holder comprised two blocks (442a and 442b), each one having the following dimensions: 52 mm (L10)×30 mm (L11)×12 mm (L12) and each one comprising a recess for independently inserting the two bar dipole magnets (441a and 441b). Each of the two bar dipole magnets (441a and 441b) was located at a distance (A3) of about 1 mm from the surface of its respective non-magnetic holder (442a and 442b) facing the other bar dipole magnet and at a distance (A4) of about 2 mm from the lowest surface of its respective non-magnetic holder (442a and 442b).

As shown in FIG. 4B, the two non-magnetic holders (442a and 442 b) were connected together with a frame (443) made of anodized aluminum and comprising two frame breadboards (443a and 443c) (Aluminum Breadboard from Thorlabs Inc.) and a frame column (443b) made of anodized aluminum (Large Right Angle Bracket AP90/RL from Thorlabs Inc.).

The frame breadboard (443a) had the following dimensions: 450 mm (L21)×300 mm (L22)×13 mm (L23). The frame column (443b) had the following dimensions: 176 mm (L24)×125 mm (L26)×30 mm (L25). The frame breadboard (443c) had the following dimensions: 385 mm (L28)× 100 mm (L27)×13 mm (L23).

The frame (443) comprised three right angle plates (443d) having the following dimensions: 64 mm (L29)×8 mm (L30)×75 mm (L31)×8 mm (L32)×8 mm (L33)×70 mm (L34)×34 mm (L35).

Sample 1 (FIG. 4)

A 25 mm×25 mm square sample was printed onto black paper substrate (Gascogne Laminates M-cote 120) (410) with the UV-curable screen printing ink of Table 1 with a laboratory screen printing device using a T90 screen so as to form a coating layer (420) having a thickness of about 20 µm.

While the coating layer (420) was still in a wet and not yet hardened state, the substrate (410) was placed on top of the first magnetic field generating device (430), in particular on top of the non-magnetic holder (431), with the center of said coating layer (420) being placed on the center of the first magnetic field generating device (430). The substrate (410) carrying the coating layer (420) was placed at a distance (A2) of about 15 mm from the top surface of said first magnetic field generating device (430), i.e. the substrate (410) was placed in direct contact with the holder (431), so as to form an assembly. The magnetic axis of the bar dipole magnet of said first magnetic field generating device (430) was substantially parallel to the substrate (410) surface with the North pole pointing in a direction substantially perpendicular to the two opposing magnetic axes of the bar magnets (441a, 441b) of the second magnetic field generating device (440).

As shown in FIG. 4A and with the help of the supporting block (432) and the track (433), the substrate (410) carrying the coating layer (420) and the non-magnetic holder (431) comprising the first magnetic field generating device (430) were concomitantly moved back and forth eight times at a linear speed of about 10 cm/s in the vicinity of the second magnetic field generating device (440). The substrate (410) carrying the coating layer (420) and the holder (431) comprising the first magnetic field generating device (430) were concomitantly moved in the vicinity of the second magnetic field generating device (440), the center of the first magnetic field generating device (430) (also corresponding to the center of the coating layer (420)) being placed at a distance (½ A1) of about 24 mm from each bar dipole magnets (441a and 441b) and the surface of the substrate (410) being flush with the bottom surface of the dipole bar magnets (441a and 441b). Each of the two bar dipole magnets (441a and 44ab) of said second magnetic field generating device (440) had a magnetic axis perpendicular to the substrate (410) surface and the two bar dipole magnets (441a and 441b) had an opposite magnetic direction, i.e. one of said two bar dipole magnets (441a) had its South pole pointing to the substrate (410) surface and the other (441b) had its North pole pointing to the substrate (410) surface.

While the substrate (410) carrying the coating layer (420) was still in contact with the non-magnetic holder (431) comprising the first magnetic field generating device (430) and while the substrate (410) carrying the coating layer (420) and the non-magnetic holder (431) comprising the first magnetic field generating device (430) were concomitantly moving at a distance (X) of about 50 mm away from the second magnetic field generating device (440) in the direction of the movement (shown as a grey arrow in FIG. 4A), the coating layer (420) was hardened upon exposure during about 0.5 second to a UV-LED-lamp (450) from Phoseon (Type FireFlex 50×75 mm, 395 nm, 8 W/cm$^2$) positioned at a distance of about 30 mm from the top surface of the substrate (410) carrying the coating layer (420) so as to form an OEL.

Comparative Sample 1

The comparative sample was prepared according to a general procedure according to the prior art WO 2015/086257 A1, comprising the following steps:

step i): a 25 mm×25 mm square sample was printed onto black paper substrate (Gascogne Laminates M-cote 120) with the UV-curable screen printing ink of Table 1 with a laboratory screen printing device using a T90 screen so as to form a coating layer having a thickness of about 20 µm;

step ii): while the coating layer was still in a wet and not yet hardened state, the substrate was placed on top of the non-magnetic holder described for sample 1 but lacking the first magnetic field generating device, with the center of said coating layer being placed on the center of the non-magnetic holder. With the help the supporting block and the track described hereabove the coating layer was exposed to the magnetic field of the second magnetic field generating device described hereabove and moved in the vicinity of the second magnetic field generating device described for sample 1 back and forth eight times at a linear speed of about 10 cm/s, the center of the non-magnetic holder being placed at a distance of about 24 mm from each bar dipole magnets and the lowest surface of the substrate being flush with the lowest surface of the dipole bar magnets; and step iii): the substrate carrying the coating layer was removed from the magnetic field of the second magnetic field generating device and was exposed to the magnetic field of the first magnetic field generating device described hereabove. The substrate carrying the coating layer was placed at a distance of about 15 mm from the top surface of said first magnetic field generating device, i.e. the substrate was placed in direct contact with the non-magnetic holder.

step iv): partially simultaneously with step iii), the coating layer was hardened upon exposure during about 0.5 second to a UV-LED-lamp from Phoseon (Type FireFlex 50×75 mm, 395 nm, 8 W/cm$^2$) positioned at a distance of about 30 mm from the top surface of the substrate carrying the coating layer so as to form an OEL.

Brightness Measurement

Figure 5A:
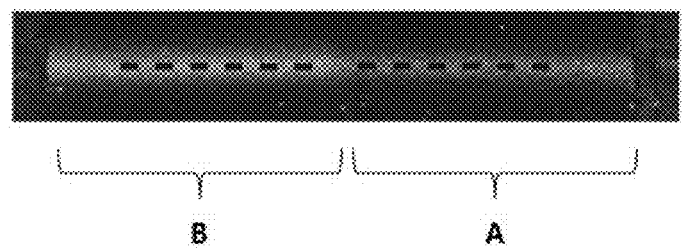
FIGS. 5A and 5B show pictures of OELs prepared according to the present invention (FIG. 5A) and prepared according to a comparative process (FIG. 5B).
Figure 5B:
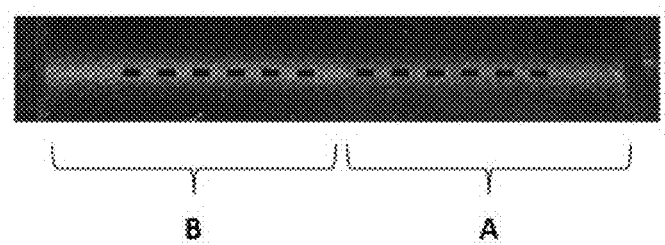

The brightness of the OEL of Sample 1 and of Comparative sample 1 was independently compared to an OEL prepared by only using the first magnetic field generating device (430) described above and according to the following process: i) applying the coating layer of Table 1 (420) (25×25 mm) on a substrate (410) (black paper substrate from Gascogne Laminates M-cote 120) with a laboratory screen printing device using a T90 screen so as to form a coating layer having a thickness of about 20 µm;

ii) exposing the substrate (420) to the first magnetic field generating device (430) by placing the substrate (410) on top of and in direct contact with the non-magnetic holder (431);

iii) applying a photomask (a 30×30 mm aluminum plate (100% opacity) comprising a 12.5×25 mm void) to hide about half of the surface of the not yet hardened coating layer (420), iv) partially simultaneously with the orientation step, i.e. while the substrate (410) carrying the coating layer (420) was still exposed to the magnetic field of the first magnetic-field generating device (430), exposing said half-masked coating layer (420) during 0.5 sec to the UV radiation of a UV-LED-lamp from Phoseon (Type FireFlex 50×75 mm, 395 nm, 8 W/cm$^2$) at a distance of about 30 mm from the top surface of the substrate (410), so as to fix/freeze the orientation of the optically variable magnetic pigment particles in the unmasked area (FIG. 5A and FIG. 5B, area A) of the coating layer (410), v) removing the photomask, and vi) applying the procedure used to prepare Sample 1 and Comparative sample 1 to the substrate (420) so as to orient the platelet-shaped magnetic optically variable pigment particles in the not yet hardened area corresponding to the initially masked area (FIG. 5A and FIG. 5B, area B).

The resulting OELs are shown in FIG. 5A (Sample 1) and FIG. 5B (Comparative sample 1).

The brightness difference between the area A and the area B was quantified according to the following method:

a) taking a picture of the OEL using the following set-up:
  i. Lighting: Reflecta LED Videolight RPL49, positioned at a 12.5° angle to the OEL and at a distance of 45 cm
  ii. Camera: Nikon D800, ISO800, aperture F40, speed 1/125s, color temperature 5565K, objective: AF-S Micro Nikkor 105 mm 2.8G ED, manual focus at 45 cm
  iii. In-camera conversion of each picture to color 8-bit TIFF format
  iiii. Analysis software: Adobe Photoshop CS4
  v. Lightness scale (V): 0 (full black) to 255 (full white)

b) opening each picture in Photoshop and transforming it in a grey scale 8-bit image by applying the Image/Adjustment/Black&White operation. Two virtual dotted lines comprising 6 segments were drawn along the brightest area of each picture, one on the initially masked area (FIG. 5A and FIG. 5B, area A) of the OEL and the other on the initially unmasked area of the OEL (FIG. 5A and FIG. 5B, area B). Inside each segment, the lightness V was determined and two average values, $V_a$ and $V_b$ were calculated. $V_a$ corresponded to the maximal brightness of the area B of the OEL that, and $V_b$ corresponded to the area A of the OEL. The orientation method described herein therefore resulted in a brightness increase calculated in % as $\Delta V=[(V_a-V_b)/V_b]*100$.

The brightness increase $\Delta V$ for Sample 1 (FIG. 5A) was 64%, whereas $\Delta V$ for Comparative sample 1 (FIG. 5B) was 40%.

The invention claimed is:

1. A process for producing an optical effect layer on a substrate, said process comprising the steps of:
  a) applying onto a substrate surface a coating composition comprising platelet-shaped magnetic or magnetizable pigment particles so as to form a coating layer on said substrate, said coating composition being in a first state,
  b) placing the substrate carrying the coating layer on a first magnetic-field-generating device providing a first magnetic field vector component, said first magnetic-field-generating device being mounted on a transferring device thereby subjecting the platelet-shaped magnetic or magnetisable pigment particles to said first magnetic field vector component, concomitantly moving said substrate carrying the coating layer and said first magnetic-field-generating device in the vicinity of a static second magnetic-field-generating device, said second magnetic-field-generating device providing a second magnetic field vector component thereby subjecting the platelet-shaped magnetic or magnetisable pigment particles to a time-dependent resultant magnetic field formed by the first and second magnetic field vector components so as to bi-axially orient at least a part of the platelet-shaped magnetic or magnetizable pigment particles, and c) hardening the coating composition to a second state so as to fix the platelet-shaped magnetic or magnetizable pigment particles in their adopted positions and orientations.

2. The process according to claim 1, wherein the transferring device is a rotating magnetic cylinder.

3. The process according to claim 1, wherein the step of applying the coating composition onto the substrate is carried out by printing process selected from the group consisting of intaglio printing, screen printing, rotogravure printing and flexography printing.

4. The process according to claim 1, wherein the coating composition is a UV-Vis curable composition and the hardening is carried out by UV-Vis curing.

5. The process according to claim 1, wherein the step c) of hardening the coating composition is carried out partially simultaneously with the step b).

6. The process according to claim 1, wherein the first magnetic-field-generating device is selected from the group consisting of dipole magnets, quadrupolar magnets and combinations thereof.

7. The process according to claim 1, wherein the second magnetic-field-generating device comprises a) a linear arrangement of at least three magnets that are positioned in a staggered fashion, wherein each of said three magnets has its magnetic axis substantially perpendicular to the substrate surface, and wherein said at least three magnets at the same side of a feedpath have the same polarity, which is opposed to the polarity of the magnet(s) on the opposing side of the feedpath, b) a linear permanent magnet Halbach array, c) one or more pairs of two bar dipole magnets, wherein each of said two bar dipole magnets has its magnetic axis substantially parallel to the substrate surface and wherein the two bar dipole magnets have an opposite magnetic direction, d) one or more pairs of two bar dipole magnets, wherein each of said two bar dipole magnets has its magnetic axis substantially perpendicular to the substrate surface and wherein the two bar dipole magnets have an opposite magnetic direction or e) a U-shaped magnet.

8. The process according to claim 1, wherein the platelet-shaped magnetic or magnetizable pigment particles are platelet-shaped optically variable magnetic or magnetizable pigment particles selected from the group consisting of platelet-shaped magnetic thin-film interference pigment particles, platelet-shaped magnetic cholesteric liquid crystal pigment particles, platelet-shaped interference coated pigment particles comprising a magnetic material and mixtures of two or more thereof.

9. The process according to claim 1, wherein the substrate is selected from the group consisting of papers or other fibrous materials, paper-containing materials, glasses, metals, ceramics, plastics and polymers, metalized plastics or polymers, composite materials and mixtures or combinations thereof.

10. A method of manufacturing a security document or a decorative element or object, comprising:
a) providing a security document or a decorative element or object, and
b) providing an optical effect layer according to the process claim 1 so that it is comprised in the security document or decorative element or object.

11. The method of claim 1, wherein the transferring device is a linear magnetic transfer device.

12. The method of claim 1, wherein the second magnetic field vector component of the second magnetic field generating device is substantially non-parallel to the first magnetic field vector component.

13. The method of claim 1, wherein the second magnetic field vector component of the second magnetic field generating device is substantially perpendicular to the first magnetic field vector component of the of first magnetic field generating device.

* * * * *